(12) United States Patent
Kondo

(10) Patent No.: US 10,015,984 B2
(45) Date of Patent: Jul. 10, 2018

(54) DISINTEGRABLE CAPSULE, MANUFACTURING METHOD FOR SAME, AND SMOKING DEVICE CONTAINING SAID DISINTEGRABLE CAPSULE

(71) Applicant: SUNSHO PHARMACEUTICAL CO., LTD., Shizuoka (JP)

(72) Inventor: Takashi Kondo, Shizuoka (JP)

(73) Assignee: SUNSHO PHARMACEUTICAL CO., LTD., Shizuoka (JP)

(*) Notice: Subject to any disclaimer, the term of this patent is extended or adjusted under 35 U.S.C. 154(b) by 221 days.

(21) Appl. No.: 14/651,849

(22) PCT Filed: Apr. 15, 2014

(86) PCT No.: PCT/JP2014/060663
§ 371 (c)(1),
(2) Date: Jun. 12, 2015

(87) PCT Pub. No.: WO2014/171433
PCT Pub. Date: Oct. 23, 2014

(65) Prior Publication Data
US 2016/0021927 A1   Jan. 28, 2016

(30) Foreign Application Priority Data

Apr. 15, 2013 (WO) .................. PCT/JP2013/061224

(51) Int. Cl.
*A24D 1/00* (2006.01)
*A24D 3/06* (2006.01)
*A23P 10/35* (2016.01)

(52) U.S. Cl.
CPC .............. *A24D 1/002* (2013.01); *A23P 10/35* (2016.08); *A24D 3/061* (2013.01)

(58) Field of Classification Search
None
See application file for complete search history.

(56) References Cited

U.S. PATENT DOCUMENTS

| 4,889,144 A | 12/1989 | Tateno et al. |
| 6,117,455 A * | 9/2000 | Takada ................ A61K 9/1611 424/426 |

(Continued)

FOREIGN PATENT DOCUMENTS

| EP | 2 550 877 | 1/2013 |
| JP | 64-20078 | 1/1989 |

(Continued)

OTHER PUBLICATIONS

Partial Supplementary European Search Report dated Nov. 22, 2016 in corresponding European Application No. 14784928.5.

(Continued)

*Primary Examiner* — Cynthia Szewczyk
(74) *Attorney, Agent, or Firm* — Wenderoth, Lind & Ponack, L.L.P.

(57) ABSTRACT

The purpose of the present invention is to provide a breakable capsule, which is characterized by
having no adhesion between capsules each other,
having no over time change of the capsule contents,
having excellent heat resistance and moisture resistance,
being easily ruptured under the pressure imposed by the fingers,
having good cracking feeling, and releasing the content
and the present invention relates to a breakable capsule, which comprises a capsule having a content and a capsule shell, wherein the capsule is characterized by
having an oily ingredient as a content,
having at least a shell-forming material as a capsule shell, and satisfying the following equations (1) and (2), $$150 < (X) < 630 \quad (1)$$

wherein (X) represents crush strength (g)/outer diameter of a capsule (mm), $$0.15 \le (Y) \le 0.53 \quad (2)$$

(Continued)

wherein (Y) represents distance/outer diameter ratio, where the distance represents the distance (mm) that is deformed to reach the maximum load, when the capsule is ruptured over the press under the condition of 22° C., 80% RH.

21 Claims, 3 Drawing Sheets

(56) References Cited

U.S. PATENT DOCUMENTS

| | | | |
|---|---|---|---|
| 6,214,376 | B1 | 4/2001 | Gennadios |
| 6,482,433 | B1 * | 11/2002 | DeRoos ............... B01J 13/043 424/439 |
| 2003/0098033 | A1 | 5/2003 | MacAdam et al. |
| 2004/0074507 | A1 | 4/2004 | MacAdam et al. |
| 2004/0261807 | A1 | 12/2004 | Dube et al. |
| 2005/0066980 | A1 | 3/2005 | Crooks et al. |
| 2005/0066981 | A1 | 3/2005 | Crooks et al. |
| 2005/0066982 | A1 | 3/2005 | Clark et al. |
| 2005/0066983 | A1 | 3/2005 | Clark et al. |
| 2005/0066984 | A1 | 3/2005 | Crooks et al. |
| 2006/0174901 | A1 | 8/2006 | Karles et al. |
| 2006/0272663 | A1 | 12/2006 | Dube et al. |
| 2007/0227548 | A1 | 10/2007 | Crooks et al. |
| 2008/0029110 | A1 * | 2/2008 | Dube .................... A24B 13/00 131/275 |
| 2008/0279947 | A1 | 11/2008 | Nowak et al. |
| 2009/0050163 | A1 | 2/2009 | Hartmann et al. |
| 2009/0277465 | A1 | 11/2009 | Karles et al. |
| 2010/0222259 | A1 * | 9/2010 | Arai .................... A61K 31/685 514/1.3 |
| 2010/0294290 | A1 | 11/2010 | Zhang |
| 2011/0023896 | A1 | 2/2011 | Dube et al. |
| 2011/0232658 | A1 | 9/2011 | Dube et al. |
| 2011/0271968 | A1 | 11/2011 | Carpenter et al. |
| 2012/0037173 | A1 | 2/2012 | Clark et al. |
| 2013/0019884 | A1 | 1/2013 | Sashide et al. |
| 2014/0053855 | A1 | 2/2014 | Hartmann et al. |

FOREIGN PATENT DOCUMENTS

| | | |
|---|---|---|
| JP | 64-60363 | 3/1989 |
| JP | 8-10313 | 1/1996 |
| JP | 8-245372 | 9/1996 |
| JP | 2001-288075 | 10/2001 |
| JP | 2003-304856 | 10/2003 |
| JP | 3493563 | 11/2003 |
| JP | 2007/507230 | 3/2007 |
| JP | 2007-520204 | 7/2007 |
| JP | 2008-43347 | 2/2008 |
| JP | 2008-528053 | 7/2008 |
| JP | 2008-533260 | 8/2008 |
| JP | 2008-546400 | 12/2008 |
| JP | 2009-504175 | 2/2009 |
| JP | 5117579 | 10/2012 |
| JP | 2013-55951 | 3/2013 |
| WO | 02/083827 | 10/2002 |
| WO | 2007/010407 | 1/2007 |
| WO | 2007/060543 | 5/2007 |

OTHER PUBLICATIONS

Extended European Search Report dated Apr. 11, 2017 in corresponding European Application No. 14784928.5.
International Preliminary Report on Patentability dated Oct. 20, 2015 in International Application No. PCT/JP2014/060663.
International Search Report dated Aug. 5, 2014 in International (PCT) Application No. PCT/JP2014/060663.

* cited by examiner

[Figure 1]
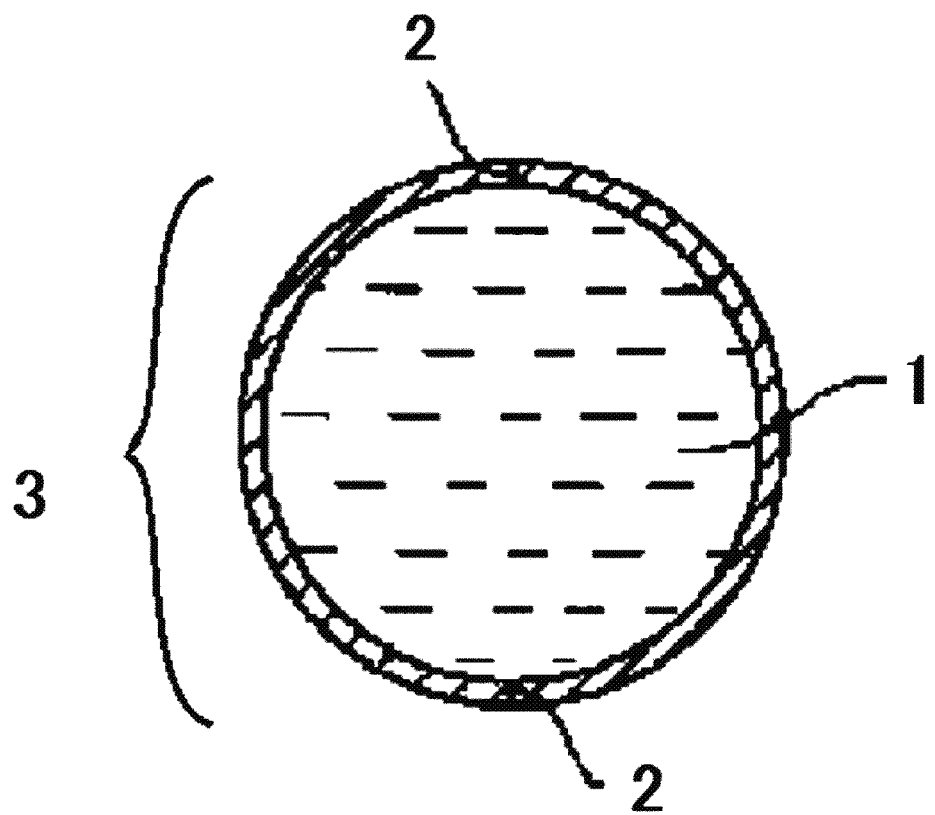

[Figure 2]
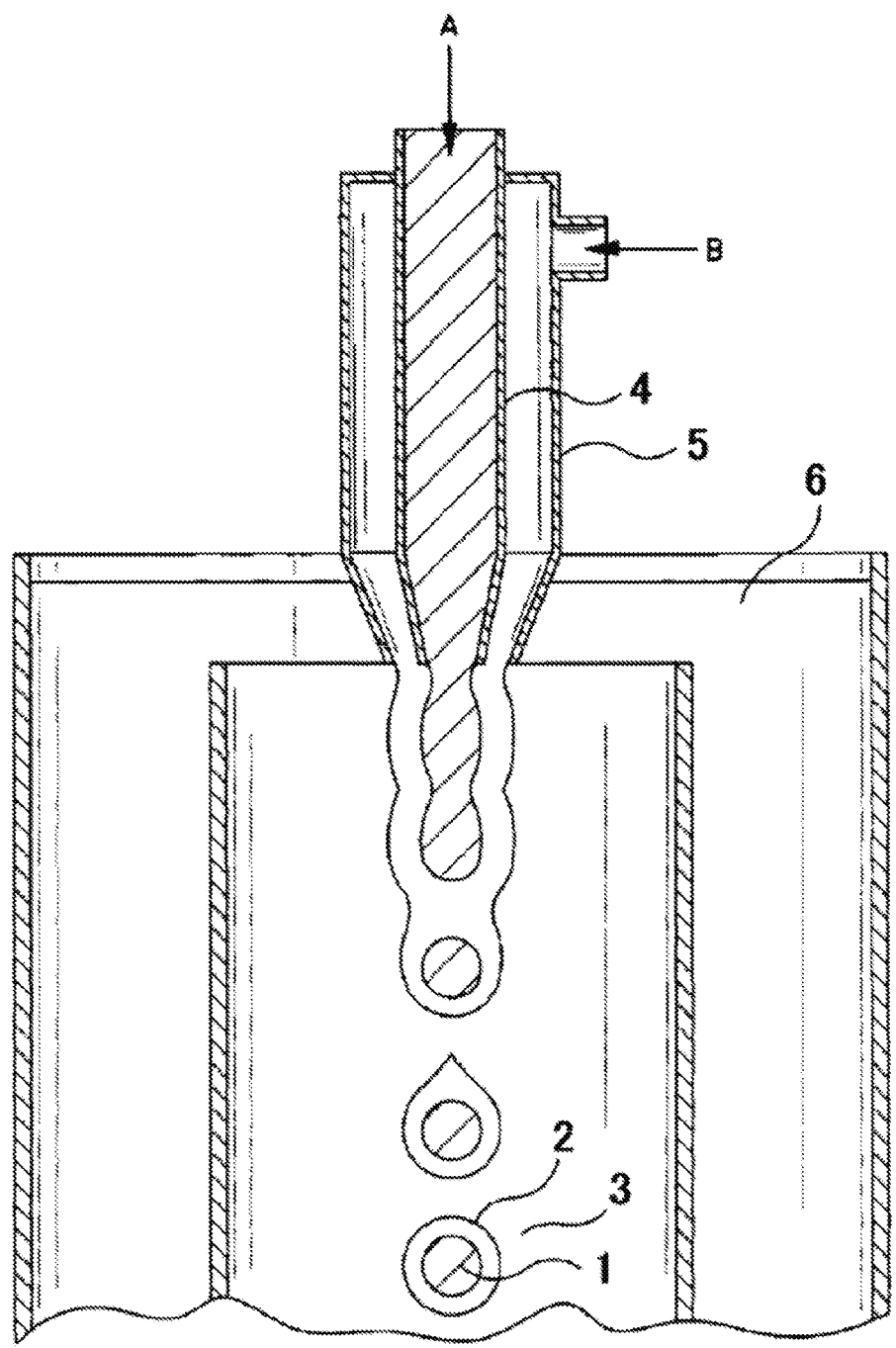

[Figure 3]
[Figure 4]
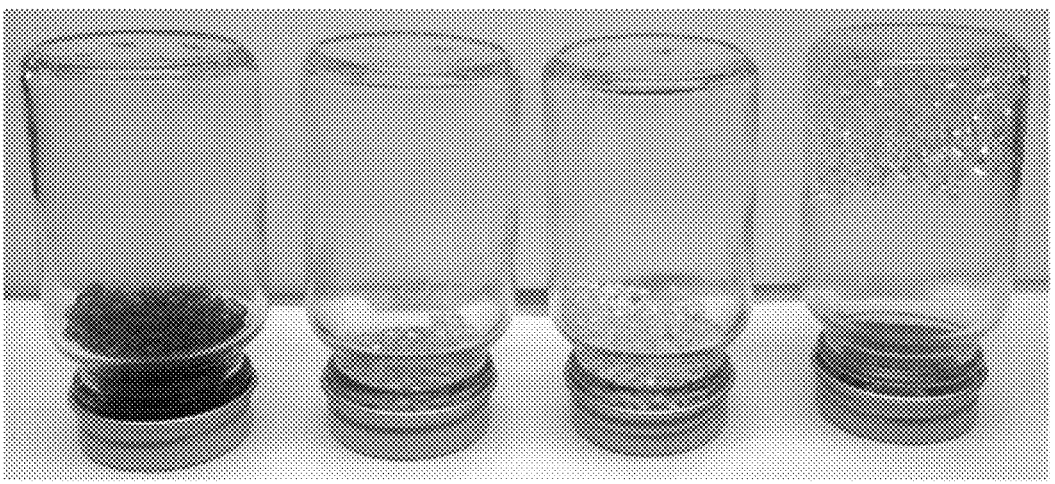

DISINTEGRABLE CAPSULE, MANUFACTURING METHOD FOR SAME, AND SMOKING DEVICE CONTAINING SAID DISINTEGRABLE CAPSULE

TECHNICAL FIELD

This invention relates to a breakable capsule.

BACKGROUND ART

Previously a capsule is widely used in the field of drugs, cosmetics, health foods, etc. (Patent Literature 1). Recently because of the spread of its usage, the technology of the capsule to be rupturable as well as the technology of the capsule not to be rupturable by increasing the capsule shell strength has been required.

The usage of the technology of the capsule to be rupturable includes, for example, that at the time of smoking, a smoker enjoys a fragrance by rupturing the capsule containing perfume, etc. wherein the capsule is buried in the cigarette filter, and a smoker enjoys also the sound and feeling at the time of rupturing the capsule.

Therefore, in order to make capsule rupturable, the capsule with a thin capsule shell has been developed. For example, the Patent Literature 2 discloses, when the soft capsule has the joint, to slant the adhesion surface of the joint and to increase the thickness of only the bonding portion with a fringe provided by a special mold. The Patent Literature 2 discloses to suppress the adhesive shell portion to be locally thin in a soft capsule which has the joint for a bathing additive.

However, when the capsule shell is thicken, the capsule strength becomes higher and the capsule cannot be crushed by the fingers, but the capsule is deformed without rupturing.

When increasing the content of the gelling agent in the capsule shell in order to avoid the problem, manufacturing the capsule may become difficult due to the high viscosity.

In addition, the perfume contained in the capsule is often volatile and therefore, it requires storage stability of the content until the time used. Furthermore, when the capsule is used in a smoking device, the capsule may be soften by moisture during smoking, and even if a smoker imposes a pressure by the fingers, there is a risk that a capsule might not be ruptured.

It is well known to use, for example, carrageenan as a gelling agent of the capsule shell. However, as carrageenan has a high viscosity-increasing effect and has a fast gelling speed, to contain a large amount of carrageenan in the capsule shell disturbs the encapsulation. In other words, if the content ratio of carrageenan is high, the capsule has poor moldability such as poor sphericity and the ease of coagulation at the injection nozzle tip because of the high viscosity and the early gelation, which made it impossible to prepare the preferable capsule.

On the other hand, for example, the Patent Literature 3 discloses that blending carrageenan with starch, dextrin and non-gelling polysaccharides as a material or filler to increase the solid concentration of the shell achieves the low viscosity and the relaxation of the gelation velocity.

However, not only in the case employing the gelatin as a shell but also in the case employing carrageenan which is regarded as lower hygroscopicity comparing with gelatin, when blending starch, dextrin, non-gelling polysaccharides, as the shell is subject to the effect of humidity, in some cases it is hard to get added value over time stably such as easiness of rupturing by the fingers after drying, the sound and feeling at the time of rupturing the capsule.

Also, the Patent Literatures 4 to 11 disclose burying the capsule in the cigarette filter, but it has not been taken into consideration that added value such as production of the capsule, storage stability, easiness of rupturing by the fingers after drying, and the sound and feeling at the time of rupturing the capsule.

Furthermore, when the breakable capsule is used in cigarettes, as cigarettes are used in local climate of a wide variety worldwide, there is room for improving heat resistance and moisture resistance.

CITATION LIST

Patent Literature

[Patent Literature 1] Japanese Unexamined Patent Application Publication No. 64-20078
[Patent Literature 2] Japanese Unexamined Patent Application Publication No. 2001-288075
[Patent Literature 3] U.S. Pat. No. 6,214,376
[Patent Literature 4] Japanese Unexamined Patent Application Publication (Translation of PCT Application) No. 2009-504175
[Patent Literature 5] Japanese Unexamined Patent Application Publication (Translation of PCT Application) No. 2008-528053
[Patent Literature 6] Japanese Unexamined Patent Application Publication (Translation of PCT Application) No. 2008-546400
[Patent Literature 7] Japanese Unexamined Patent Application Publication No. 2008-43347
[Patent Literature 8] Japanese Unexamined Patent Application Publication (Translation of PCT Application) No. 2007-507230
[Patent Literature 9] Japanese Unexamined Patent Application Publication (Translation of PCT Application) No. 2007-520204
[Patent Literature 10] Japanese Unexamined Patent Application Publication No. 2003-304856
[Patent Literature 11] Japanese Unexamined Patent Application Publication No. 64-60363

SUMMARY OF INVENTION

Technical Problem

The purpose of the present invention is to provide a breakable capsule which is characterized by having no adhesion between capsules each other, having no over time change of the capsule contents, having excellent heat resistance and moisture resistance, being easily ruptured under pressure imposed by the fingers, having a good cracking feeling, and releasing the content.

Solution to Problem

This invention relates to the following inventions.
[1] A breakable capsule, may be called Capsule A, which comprise a capsule having a content and a capsule shell, wherein the capsule is characterized by
having an oily ingredient as a content,
having at least a shell-forming material as a capsule shell, and satisfying the following equation (1) and equation (2), $$150 \leq (X) \leq 630 \tag{1}$$

wherein (X) represents crush strength (g)/outer diameter of a capsule (mm), $$0.15 < (Y) < 0.53 \tag{2}$$

wherein (Y) represents distance/outer diameter ratio, where the distance represents the distance (mm) that is deformed to reach the maximum load, when the capsule is ruptured over the press under the condition of 22° C., 80% RH.

[2] The breakable capsule according to the article [1], wherein the shell thickness of the capsule is 5 to 120 μm.

[3] The breakable capsule according to the article [1] or [2], wherein the shell ratio is 5.0% or more and 18.0% or less.

[4] The breakable capsule according to any one of the articles [1] to [3], wherein the water content ratio in the capsule shell is 10.0% to 19.0%.

[5] The breakable capsule according to any one of the articles [1] to [4], wherein the crush strength is 150 to 4000 g.

[6] The breakable capsule according to any one of the articles [1] to [5], wherein the equation (2) is $0.18 \leq (Y) \leq 0.5$.

[7] The breakable capsule according to any one of the articles [1] to [6], wherein the water activity of a capsule shell is 0.400 or more and 0.650 or less.

[8] The breakable capsule according to any one of the articles [1] to [7], wherein the breakable capsule is a seamless capsule.

[9] The breakable capsule according to any one of the articles [1] to [8], wherein the outer diameter of the capsule is 1.0 to 15.0 mm.

[10] The breakable capsule according to any one of the articles [1] to [9], wherein the shell-forming material is at least one selected from the group consisting of agar, carrageenan and gelatin.

[11] The breakable capsule according to any one of the articles [1] to [10], wherein the shell-forming material comprises agar having the jelly strength of 600 g/cm$^2$ or more, or gelatin having the bloom strength of 190 or more.

[12] The breakable capsule according to the article [10] or [11], wherein the carrageenan is kappa carrageenan or iota carrageenan.

[13] The breakable capsule according to any one of the articles [1] to [12], wherein the shell-forming material comprises agar and carrageenan.

[14] The breakable capsule according to any one of the articles [1] to [13], wherein the shell-forming material comprises the weight ratio ager/carrageenan of ager relative to carrageenan is 90/10 to 30/70.

[15] The breakable capsule according to any one of the articles [1] to [14], wherein the capsule shell further comprises at least one shell-forming agent selected from the group consisting of alginic acid or a salt thereof, furcellaran, curdlan, ghatti, gum arabic, pullulan, welan, xanthan gum, gellan gum, gum tragacanth, pectin, glucomannan, guar gum, tara gum, tamarind seed gum, locust bean gum, psyllium seed gum, linseed gum, and diutan gum.

[16] The breakable capsule according to the article [15], wherein the shell-forming agent comprises guar gum (non-derivatized guar gum or a derivative thereof).

[17] The breakable capsule according to the article [16], wherein guar gum comprises an enzymolysis product of guar gum.

[18] The breakable capsule according to any one of the articles [15] to [17], wherein the shell-forming agent comprises guar gum, and alginic acid or a salt thereof.

[19] The breakable capsule according to the article [18], wherein the alginic acid salt is sodium alginate.

[20] The breakable capsule according to the article [18] or [19], wherein the weight ratio of alginic acid or a salt thereof relative to guar gum is 70/30 to 10/90.

[21] The breakable capsule according to any one of the articles [15] to [20], wherein the weight ratio of the shell-forming material and the shell-forming agent relative to the capsule shell are 60 wt % or more.

[22] The breakable capsule according to any one of the articles [15] to [21], wherein the ratio of the shell-forming agent is 0.1 to 5 pts·wt. based on 1 pt·wt. of the shell-forming material.

[23] The breakable capsule according to any one of the articles [15] to [22], wherein the capsule shell comprises the shell-forming material including agar and carrageenan, and the shell-forming agent including guar gum, wherein the weight ratio ager/carrageenan of ager relative to carrageenan is 85/15 to 35/65; the weight ratio of the shell-forming material and the shell-forming agent relative to the capsule shell is 70 wt % or more; and the ratio of the shell-forming agent in the capsule shell is 0.3 to 3 pts·wt. based on 1 pt·wt. of the shell-forming material.

[24] The breakable capsule according to any one of the articles [1] to [23], wherein the capsule shell further comprises at least one plasticizer selected from polyhydric alcohol, monosaccharide, disaccharide, oligosaccharide, sugar alcohol, polyvinyl alcohol, triacetin, a starch derivative, starch and a cellulose derivative.

[25] The breakable capsule according to the article [24], wherein the plasticizer comprises at least one plasticizer selected from glycerin, starch, a starch derivative and a cellulose derivative.

[26] The breakable capsule according to the article [24] or [25], wherein the plasticizer comprises polyhydric alcohol and a plasticizer other than polyhydric alcohol.

[27] The breakable capsule according to any one of the articles [24] to [26], wherein the plasticizer comprises glycerin and at least one plasticizer selected from starch, a starch derivative and a cellulose derivative in the weight ratio of glycerin relative to the said selected plasticizer to be 90/10 to 10/90.

[28] The breakable capsule according to the article [26] or [27], wherein the ratio of the plasticizer is 3 to 40 pts·wt. based on 100 pts·wt. of the shell-forming material.

[29] The breakable capsule according to any one of the articles [1] to [28], wherein the breakable capsule is used for a smoking device.

[30] A smoking device comprising the breakable capsule according to any one of the articles [1] to [28].

[31] Process for manufacturing the breakable capsule according to any one of the articles [1] to [28], wherein the viscosity of the capsule shell liquid at 90° C. is 70 to 500 mPa·s or more.

In addition, the present invention includes a breakable capsule, which may be called Capsule B, having a content and a capsule shell, wherein the capsule comprises an oily ingredient as a content and a shell-forming material which includes specifically ager and carrageenan and a shell-forming agent which includes specifically at least guar gum, as a capsule shell. The breakable capsule mentioned above may satisfy the said equation (1) and/or equation (2) which are defined in the said Capsule A.

In the capsule, an ingredient similar to the above can be used as a shell-forming agent and a shell-forming material. A typical capsule (Capsule B) comprises a shell-forming material which includes agar and carrageenan, and a shell-forming agent which includes a non-derivatized guar gum or a derivative thereof. In the Capsule B, the type and ratio of a shell-forming material and a shell-forming agent can be selected from the type and range similar to the said Capsule A.

For example, the said shell-forming material may include ager and carrageenan in the weight ratio of ager relative to carrageenan to be 90/10 to 30/70. Then, guar gum may include an enzymolysis product of guar gum. Furthermore, in Capsule B, the said shell-forming agent may include guar gum, and alginic acid or a salt thereof. In this case, the weight ratio of alginic acid or a salt thereof relative to guar gum may be 70/30 to 10/90. Furthermore, the weight ratio of the shell-forming material and the shell-forming agent relative to capsule shell may be 60 wt % or more. In Capsule B, the ratio of the shell-forming agent may be 0.1 to 5 pts·wt. based on 1 pt·wt. of the shell-forming material. The representative Capsule B includes a capsule wherein the weight ratio ager/carrageenan of ager relative to carrageenan is 85/15 to 35/65; the weight ratio of the shell-forming material and the shell-forming agent relative to the capsule shell is 70% or more; and the ratio of the shell-forming agent in the capsule shell is 0.3 to 3 pts·wt. based on 1 pt·wt. of the shell-forming material.

In addition, in Capsule B, the capsule shell may further comprise at least one plasticizer selected from polyhydric alcohol, monosaccharide, disaccharide, oligosaccharide, sugar alcohol, polyvinyl alcohol, triacetin, a starch derivative, starch and a cellulose derivative. Particularly the plasticizer may include at least one plasticizer selected from glycerin, starch, a starch derivative and a cellulose derivative. When the capsule includes the plasticizer, the ratio of the plasticizer is 3 to 40 pts·wt. based on 100 pts·wt. of the shell-forming material.

Capsule B may also be a smoking device in a way similar to Capsule A. Therefore the present invention includes the smoking device comprising Capsule B.

Advantageous Effects of Invention

The breakable capsule of the present invention is characterized by improving the adhesion between capsules each other, having excellent heat resistance and moisture resistance, having no over time change of the capsule content, being easily ruptured under a pressure imposed by the fingers, having a good cracking feeling, and releasing the content. In addition, as the capsule can be easily ruptured, the capsule gives an excellent palatability such as an enjoyable cracking feeling. Furthermore, the capsule to be obtained is excellent in a cracking feeling, heat resistance and moisture resistance to be homogenized and less variation. From other aspects, by making a breakable capsule of the present invention transparent or translucent, coloring that matches the image of the product is also possible.

BRIEF DESCRIPTION OF DRAWINGS

FIG. 1 is a schema which shows a breakable capsule of the present invention.

FIG. 2 shows a composite nozzle device which is aligned in a properly substantially concentric circle for use of the present invention.

FIG. 3 is a photograph of capsules after the heat resistance test.

FIG. 4 is a photograph of capsules after the heat resistance test.

DESCRIPTION OF EMBODIMENTS

A breakable capsule of the present invention is, as shown in FIG. 1, capsule 3 having a content 1 and a capsule shell 2, wherein the capsule comprises an oily ingredient as a content, and at least a shell-forming material as a capsule shell. This capsule may satisfy the following equation (1) and equation (2), $$150 < (X) < 630 \quad (1)$$

wherein (X) represents crush strength (g)/outer diameter of a capsule (mm), $$0.15 \leq (Y) \leq 0.53 \quad (2)$$

wherein (Y) represents distance/outer diameter ratio, where the distance represents the distance (mm) that is deformed to reach the maximum load, when the capsule is ruptured over the press under the condition of 22° C., 80% RH.

The breakable capsule of the present invention can be used for a smoking device, preferably a cigarette, a cigar or a pipe.

After the breakable capsule of the present invention is buried in a smoking device, the capsule can be broken under the pressure imposed by the fingers. The content such as perfume is released by breaking the shell, and the scent can be enjoyed.

The shape of the breakable capsule of the present invention may include, but not particularly limited to, a ball-shape, a football-shape, preferably a ball-shape, more preferably an exact spherical-shape.

In the case of an exact spherical-shape, the ratio of the minor axis/major axis of the breakable capsule of the present invention includes, but not particularly limited in detail to, preferably 0.90 to 1.00 and more preferably 0.95 to 1.00. By employing the ratio of the above, the breakable capsule has a suitable crush strength, has excellent storage stability, breaks easily, and can be stored in the filter when used for the filter of the smoking device.

In the breakable capsule of the present invention, the equation (1) is as follows:

$$150 < (X) < 630 \quad (1)$$

wherein (X) represents crush strength (g)/outer diameter of a capsule (mm), the said crush strength (g) is a value which is measured with Rheometer CR-500DX (measuring equipment made by Sun Scientific Co., Ltd.) at 22° C., 60% RH and is analyzed with Rheo data analyzer (Rheo Data analyzer for Win, automatic analysis software for physicochemical property data made by Sun Scientific Co., Ltd.), wherein the outer diameter of a capsule (mm) means the major axis when a planar shape of the capsule (cross-section) is circular, and it means the maximum diameter when a planar shape of the capsule (cross-section) is not circular.

In the present invention, the value represented by (X) is usually more than 150 and less than 630 (e.g., 180 or more and 600 or less, preferably 190 or more and 580 or less), for example more than 200 and less than 560, preferably 220≤(X)≤530, more preferably 230≤(X)≤480, taking the excellent heat resistance and moisture resistance, being easily ruptured under an appropriate pressure imposed by the fingers, and being a good cracking feeling into consideration.

The crush strength of the breakable capsule of the present invention, which can be chosen depending on outer diameter and the like includes, but not particularly limited to, for example, 100 to 5000 g (e.g., 150 to 4000 g), preferably 200.0 to 3000.0 g, more preferably 250.0 to 2800.0 g, further preferably 700.0 to 2000.0 g.

The crush strength described below which can be achieved the effects of the present invention can be controlled by adjustment of the content of the shell-forming material and the shell-forming agent of hydrophilic polymer and/or adjustment of the manufacturing process such as a cooling step and a drying step. When the crush strength is less than 100 g, the capsule is easy to be ruptured, and when the crush strength is more than 5000 g, it becomes difficult to be crushed by the fingers, which is not preferable. The crush strength is a value which is measured with Rheometer CR-500DX (measuring equipment made by Sun Scientific Co., Ltd.) at 22° C., 60% RH and is analyzed with Rheo data analyzer (Rheo Data analyzer for Win, automatic analysis software for physicochemical property data made by Sun Scientific Co., Ltd.).

In the present invention, the distance is the value measured with Rheometer CR-500DX made by Sun Scientific Co., Ltd. and represents the distance (major axis, mm) that is deformed to reach the maximum load, when the capsule is ruptured over the press. The ratio of distance/outer diameter can be controlled to the scope of the present invention by adjustment of the content of a shell-forming material and a shell-forming agent of hydrophilic polymer and/or adjustment of the manufacturing process such as a cooling step and a drying step as described below.

In the breakable capsule of the present invention, the ratio (Y) of distance (mm)/outer diameter (mm) under the condition of 22° C., 80% RH is usually around 0.15 or more and 0.53 or less (e.g., 0.18 to 0.5), for example, around 0.20 or more and 0.48 or less, preferably 0.22 to 0.47, more preferably 0.25 to 0.46, further preferably 0.30 to 0.45, and can be controlled to 0.34 or more (e.g., 0.35 to 0.53, preferably 0.36 to 0.5, more preferably 0.37 to 0.48). The scope described above is preferable, taking the capsule to be obtained having excellent heat resistance and moisture resistance, being easily ruptured under an appropriate pressure imposed by the fingers, and having an enjoyable feeling into consideration.

The distance under the condition of 22° C., 80% RH in a capsule with 3.5 mm outer diameter is, for example, usually around 0.5 to 1.9 mm (e.g., around 0.70 to less than 1.70 mm), preferably 0.77 to 1.65 mm, more preferably 0.88 to 1.60 mm, and can be controlled to 1.17 mm or more (e.g., 1.18 to 1.9 mm, preferably 1.2 to 1.7 mm, more preferably 1.21 to 1.65 mm).

The thickness of the breakable capsule of the present invention includes, but not particularly limited to, usually 5 to 120 μm, from the viewpoint of the particularly excellent effect obtained from the present invention, preferably 10 to 100 μm, more preferably 20 to 90 μm, particularly preferably 20 to 60 μm. The shell thickness of the capsule is a value which is measured with digital microscope made by Keyence Co., Ltd. (product name; VHX-900, using the calibration scale of 10 μm).

The shell ratio of the breakable capsule of the present invention includes, but is not particularly limited to, 5.0% or more and 18.0% or less, preferably 5.5% or more and 15.0% or less, and more preferably 5.5% or more and 12.0% or less, taking excellent heat resistance and moisture resistance, being easily ruptured under an appropriate pressure imposed by the fingers, and being a good cracking feeling into consideration. The shell ratio represents the weight ratio of the shell relative to the whole capsule weight.

The water content ratio in the capsule shell of the present invention includes, but not particularly limited to, 10.0% or more and 19.0% or less, from the viewpoint of the particularly excellent effect obtained from the present invention, preferably 11.0% or more and 18.0% or less, more preferably 12.0% to 16.0%. Since any capsules can be easily ruptured under the same pressure and the quality of the disintegration property is homogeneous, it is especially preferred that the average value of the moisture content of the capsule falls into the range described above. The water content ratio of the present invention is a value measured by the method described in Japanese Pharmacopoeia, and is specifically a value calculated by measuring the dry weight after treatment for 120 minutes starting with the state of 22° C., 60% RH and ending with the state of 110° C.

The ratio of outer diameter (μm)/shell thickness (μm) of breakable capsule is, but not particularly limited to, usually 50.0 to 300.0, preferably 80.0 to 250.0, more preferably 100.5 to 200.0. Since any capsules can be easily ruptured under the same pressure and the quality of the disintegration property is homogeneous, it is especially preferred that the average value of the ratio of outer diameter/shell thickness of the capsule falls into the range described above.

The water activity of a capsule shell is 0.400 or more and 0.650 or less, from the viewpoint of the particularly excellent effect obtained from the present invention, preferably 0.410 or more and 0.630 or less, more preferably 0.420 or more and 0.620 or less.

The moisture also causes impairment of storage stability, but microorganisms involved in decay in the capsule can only use water called "free water". The water activity value (AW) of the present invention means the ratio of free water measured with a water activity measurement system made by Rotronic AG immediately after preparation under the condition of 22° C., 60% RH (Relative Humidity). The water activity measurement system of Rotronic AG includes Aw series (e.g., Aw-lab, Aw-Palm, Aw-Quick and the like).

The outer diameter of the capsule of the present invention includes, but not particularly limited to, usually 1.0 to 15.0 mm, preferably 1.5 to 10.0 mm, more preferably 2.0 to 5.0 mm. The outer diameter of the capsule (mm) means the major axis when a planar shape of the capsule (cross-section) is circular, and it means the maximum diameter when a planar shape of the capsule (cross-section) is not circular. The size of the capsule can be adjusted by changing the rotational speed of the pump (by changing the sending amount of the liquid) during manufacturing process.

The capsule of the present invention is not particularly limited to, but a seamless capsule is preferable because the pressure is easily transmitted when rupturing the capsule by the fingers.

The capsule shell of the present invention, at least a shell-forming material is used. The shell-forming material used for the capsule shell of the present invention includes, but not limited to, agar, carrageenan, gelatin, and the like. The commercial products can be used for them. These can be used either singly or as a mixture of two or more shell-forming materials. For example, a combination of ager and carrageenan, and a combination of gelatin and carrageenan is possible, but avoiding a combination of gelatin and agar is preferable. It is preferred as the shell-forming material to combine at least a carrageenan and agar. By combining these, (further by combined with shell-forming agent, such as especially at least guar gum, described below), it is possible to efficiently obtain a capsule having excellent properties as described above. In particular, as it is not necessary to use gelatin, the capsule can be applied for usage that are adversely affected by gelatin, and in addition, it is possible to obtain a capsule with excellent properties while compensating efficiently disadvantages of gelatin (such as high hygroscopicity). The content ratio of the shell-forming materials in the capsule shell is not particularly limited as long as it does not impair the effects of the invention, but is usually 10 to 80 wt %, for example, 15 wt % or more and less than 65 wt %, preferably is 20 to 60 wt %. When the content ratio of the shell-forming material is less than 10 wt % (e.g., less than 15 wt %) or more than 80 wt % (e.g., 65 wt % or more), such cases are not preferable since the cracking feeling of the capsule is impaired.

The ager described above includes, but not particularly limited to, for example, powdered agar, solid agar, flake agar and the like, and powdered agar is preferable. The raw material of agar used in the present invention includes, but not particularly limited to, for example, red algae and the like. The red algae, for example, Tengusa (agar weed), Ogonori (Chinese moss) and the like, and agar weed is preferable. The commercial products can be used for the agar.

The ager described above is not particularly limited to, but the ager with a high strength is preferable, taking the capsule to be obtained having excellent heat resistance and moisture resistance, being easily ruptured under an appropriate pressure imposed by the fingers, and having an enjoyable feeling due to a good cracking feeling into consideration, and specifically the ager having the jelly strength of 600 g/cm² or more is preferable, the agar of 650 g/cm² or more is more preferable, and the agar of 700 g/cm² or more is further preferable. The jelly strength described above is a value measured according to Nikkansui-type measuring method, and specifically the jelly strength is determined by applying a load to a gel, being prepared by allowing a 1.5% agar aqueous solution to stand at 20° C. for 15 hours to be coagulated, to obtain the maximum weight (g) per 1 cm² surface area of the gel when the gel endures the load for 20 seconds. The said jelly strength means a value in a concentration of 1.5% aqueous solution. It is preferred as the shell-forming materials can be used either singly or as a mixture of two or more of them. The content ratio in these capsule shells is, but not particularly limited to, 60 wt % or less, preferably 55 wt % or less. When the content of the agar is more than 60 wt %, the crush strength is improved because the capsule is hardened, but on the other hand, the capsule is hardly crushed or a cracking feeling is impaired, which is undesirable.

The carrageenan described above includes, but not limited to, for example, κ (kappa) carrageenan, ι (iota) carrageenan, λ (lambda) carrageenan, μ (mu) carrageenan, ν (new) carrageenan, θ (theta) carrageenan, ξ (zeta) carrageenan, π pai) carrageenan and the like. These can be used either singly or as a mixture of two or more of them. In the present invention, κ (kappa) carrageenan and τ (iota) carrageenan are preferable, taking the capsule to be obtained having excellent gelation ability in production, excellent heat resistance and moisture resistance, being easily ruptured under an appropriate pressure imposed by the fingers, and having an enjoyable feeling due to a good cracking feeling into consideration. The carrageenan is produced by extracting with known means and methods from all algae of Gigartinales Gigartinaceae, Gigartinales Solieriaceae, Gigartinales Hypnea and the like. The commercial products can be used for carrageenan. Examples of commercially available products include Genuvisco (iota type, Sansho Co., Ltd.), Genugel (kappa type, Sansho Co., Ltd.), and Satiagel ME4 (SATIA-GEL ME4, kappa type, Cargill Japan Ltd.), and Satiagel ME4 (SATIAGEL ME4, kappa type, Cargill Japan Ltd.) and the like are preferable. After preparation of a transparent or translucent breakable capsule of the present invention, kappa carrageenan is preferably used for coloring that matches the image of the product.

The viscosity of carrageenan described above is not particularly limited to, but the carrageenan with 5 mPa·s or more is preferable, taking the capsule to be obtained having excellent storage stability and disintegration property, being easily ruptured under an appropriate pressure imposed by the fingers, and having an enjoyable feeling due to a good cracking feeling into consideration. The upper limit of the viscosity is not particularly limited, but 500 mPa·s or less is preferable. The said viscosity is a value measured by a method described in the eighth edition food additives official compendium, and for example, the viscosity can be measured by using B-type viscometer (Manufacturer: BROOK FIELD, MODEL: LVDVE115).

The carrageenan described above is not particularly limited to, but the carrageenan with pH 7.5 to pH 15.0 is more preferable and that with pH 7.8 to pH 13.0 is further preferable, taking the obtained capsule having excellent storage stability and disintegration property and the like into consideration.

The carrageenan described above include, but not particularly limited to, total amount of 2-propanol and methanol measured by a method described in the eighth edition food additives official compendium to be 0.50% or less is preferable, because the carrageenan with fewer impurities is preferable.

When carrageenan is used for the capsule shell, the content in the capsule shell of the carrageenan is, but not particularly limited to, 1.0 wt % or more and less than 50.0 wt %, preferably 3.0 wt % or more and 45.0 wt % or less. When the content of carrageenan is too high, as the viscosity of the fluid for the capsule shell becomes high, it is impossible to prepare the capsule of the present invention.

In the case of the combination of agar and carrageenan, for example, the weight ratio ager/carrageenan of ager relative to carrageenan may be 95/5 to 5/95 (e.g., 93/7 to 10/90), preferably 90/15 to 15/85 (e.g., 88/12 to 20/80), more preferably 85/15 to 25/75 (e.g., 83/17 to 30/70), usually 90/10 to 30/70 (e.g., 88/12 to 30/70, preferably 85/15 to 35/65, more preferably 83/17 to 40/60).

The gelatin described above includes, but not particularly limited to, pig gelatin, bovine gelatin, fish gelatin, and the like. The commercial products can be used for them. These can be used either singly or as a mixture of two or more gelatins. Because of restrictions on religion and problems such as allergies, when it is intended not to use ingredients from mammals, e.g., cows, pigs, etc., a non-mammalian capsule can be prepared by not using gelatin from mammals.

The gelatin described above is not particularly limited to, but gelatin derivatives such as succinic gelatin, product hydrolyzed gelatin, hydrolyzed gelatin, cross-linked gelatin may be used.

The gelatin described above is not particularly limited, but the gelatin with a high strength is preferable, and for example, a gelatin having the bloom strength of 190 or more is preferable, that of 220 or more is more preferable, and that of 250 or more is further preferable, taking the capsule to be obtained having excellent heat resistance and moisture resistance, being easily ruptured under an appropriate pressure imposed by the fingers, and having an enjoyable feeling due to a good cracking feeling into consideration. The bloom strength is defined by the mass required for the piston cylinder with a diameter of 12.7 mm to be pressed into gel at 4 mm. The commercial products can be used for them, and for example, products made by Rousselot. These can be used either singly or as a mixture of two or more of them. The content ratio in these capsule shells is, but not particularly limited to, usually less than 65 wt %, preferably 60 wt % or less. When the content ratio of the gelatin is 65 wt % and more, the crush strength is improved because the capsule is hardened, but on the other hand, the capsule is hardly crushed, which is undesirable.

The shell-forming material used for capsule shell of the present invention is not particularly limited, but embodiments which include a material having a high strength (a high jelly strength, a high bloom strength) is preferable among those described above, taking the capsule having excellent heat resistance and moisture resistance, being easily ruptured under an appropriate pressure imposed by the fingers, and having an enjoyable feeling due to a good cracking feeling into consideration.

The capsule shell of the present invention, if necessary, may further include a shell-forming agent of the hydrophilic polymer. The shell-forming agent of hydrophilic polymer used for the capsule shell of the present invention includes, but not particularly limited to, for example, alginic acid or a salt thereof, seaweed-derived polysaccharides such as furcellaran, curdlan, and the like; resin-derived polysaccharides such as ghatti gum, gum arabic gum, and the like; microbe-derived polysaccharide such as pullulan, welan gum, xanthan gum, gellan gum, and the like; plant-derived polysaccharides such as tragacanth gum, pectin, glucomannan, and the like; seed-derived polysaccharide such as guar gum, tara gum, tamarind seed gum, locust bean gum, psyllium seed gum, linseed gum and the like; fermented polysaccharides such as diutan gum, and from the viewpoint of the capsule to be obtained having excellent formability, storage stability, heat resistance and disintegration property and the like, xanthan gum, locust bean gum, guar gum, alginic acid and the salts thereof are preferable. The commercial products can be used for them. It is preferred to use the agent with a low viscosity, taking the excellent heat resistance and moisture resistance, being easily ruptured under an appropriate pressure imposed by the fingers, and the enjoyable feeling of the capsule to be obtained into consideration. These can be used either singly or as a mixture of two or more gelatins. The values represented by (X) and (Y), the shell ratio, water content ratio and water activity, and the like can be controlled to the scope of the present invention by adjustment of the content of the said shell-forming material and the shell-forming agent of hydrophilic polymer and/or adjustment of the manufacturing process such as a cooling step and a drying step. Furthermore, in order to adjust the values represented by (X) and (Y) and the like, if necessary, a plasticizer described below may be optionally added.

When the capsule shell of the present invention comprises a shell-forming agent of the hydrophilic polymer, the content ratio of the shell-forming materials and shell-forming agents of the hydrophilic polymer are not particularly limited to, as long as it does not impair the effects of the present invention, but can be chosen from the range of 60 wt % or more (e.g., 65 to 100 wt %), usually 70 wt % or more (e.g., 75 to 97 wt %), preferably 77 to 95 wt %, more preferably 80 wt % or more (e.g., 80 to 90 wt %), and 75 to 99 wt % (e.g., 80 to 98 wt %). By using these, a capsule shell liquid can be prepared, then the capsule shell of the present invention can be obtained. The mixing ratio of the shell-forming material relative to the shell-forming agent of the hydrophilic polymer in the capsule shell of the present invention is not limited, but the ratio of the shell-forming agent of the hydrophilic polymer relative to the shell-forming base is usually around 0.1 to 5 pts·wt. based on 1 pt·wt. of the shell-forming material, preferably around 0.25 to 5 pts·wt. (e.g., around 0.3 to 3 pts·wt.), more preferably around 0.5 to 3 pts·wt., and especially more preferably around 0.5 to 2 pts·wt. (e.g., around 0.6 to 1.5 pts·wt.), taking the capsule to be obtained having excellent heat resistance and moisture resistance, being easily ruptured under an appropriate pressure imposed by the fingers, and having an enjoyable feeling into consideration, from the viewpoint of more excellent effects. However, the content of each shell-forming material not exceeding the above-mentioned range is preferable.

In the capsule of the present invention, from the viewpoint of the capsule to be obtained having excellent storage stability and disintegration property, and the like, without particularly limiting, using alginic acid or a salt thereof for the capsule shell is preferred. The alginate described above is not particularly limited to, but for example, alginic acid metal salt is preferably exemplified. The alginate includes, but not particularly limited to, for example, an alkaline metal salt such as a sodium salt and a potassium salt; an alkaline earth metal salt such as a calcium and a magnesium salt; a metal salt such as an iron salt, a tin salt; and sodium alginate and potassium alginate is particularly preferable, and sodium alginate is the most preferable. In the present invention, not only using a polyvalent metal salt such as calcium alginate, but also using a monovalent metal salt such as sodium alginate gives an excellent capsule. The metal salt of the alginic acid having a low viscosity is preferable, and for example, that having 500 mPa·s or less is preferable, and that having 400 mPa·s or less is more preferable. The said viscosity is a value measured by a method described in the eighth edition food additives official compendium, and for example, the viscosity can be measured by using B-type viscometer (Manufacturer: BROOK FIELD, MODEL: LVDVE115). When making capsule of the present invention transparent or translucent, using sodium alginate as alginate is preferable. As a result, this makes the coloring of the capsule easy. These can be used either singly or as a mixture of two or more of them. Alginic acid or a salt thereof is obtained from brown algae by extraction using means and methods known in the art. The commercial products can be used for them. Examples of commercially available products include SAN ALGIN (Sansho Co., Ltd.) and the like.

When alginic acid or a salt thereof is used for the capsule shell, the ratio of alginic acid or a salt thereof in the capsule shell is, but not limited to, usually 1.0 wt % or more and less than 50.0 wt %, preferably 3.0 wt % or more and 45.0 wt % or less, further preferably 5 wt % or more and 40 wt % or less, especially 10 wt % or more and 35 wt % or less.

Also, when alginic acid or a salt thereof is used, the ratio of alginic acid or a salt thereof in the shell-forming agent may be 5 wt % or more (e.g., 8 to 100 wt %), preferably 10 wt % or more (e.g, 15 to 90 wt %), further preferably 20 wt % or more (e.g., 23 to 80 wt %,), 25 wt % or more (e.g., 28 to 70 wt %).

In the present invention, when carrageenan is used for a shell-forming material, without particularly limiting, the guar gum may be used. The guar gum is prepared from the guar seeds of legume by grinding or extracting with using known means and methods. Also, in place of the guar gum or in addition to the guar gum, the guar gum derivative may be used, and the said derivative includes, but not limited to, for example, hydroxypropyl guar gum, cationic guar gum, the decomposition product of guar gum, and the like. The decomposition products of guar gum are not particularly limited as long as they have the effects of the present invention, but include an enzymolysis product of guar gum and the like. The preferable guar gum, that is, guar gums, guar gum (non-derivatized guar gum) or derivatives thereof, includes the guar gum (non-derivatized guar gum) and the decomposition product, in particular, an enzymolysis product of guar gum is preferred.

These can be used either singly or as a mixture of two or more of them. The commercial products can be used for them. Examples of commercially available product include FIBARON (Sumitomo Dainippon Pharma Co., Ltd.), guar fiber (Meiji Food Materia Co., Ltd.), Sunfiber (Taiyo Kagaku Co., Ltd.) Do Fiber (Taisho Pharmaceutical Co., Ltd.), Neovisco G (Sansho Co., Ltd.), Meypro HPG Series (Sansho Co., Ltd.), Jaguar C-Series (Sansho Co., Ltd.), Meypro gum (Sansho Co., Ltd.), CELPHAL FG series (SOMAR Corp.), RG100 (MRC polysaccharide Co., Ltd.) and the like.

By using guar gum (or further the said shell-forming material), a capsule with relatively small variations (i.e., smaller SD value) in the crush strength, the said (X), the said (Y), etc. can be easily obtained efficiently. Therefore, it is easy to homogenize a cracking feeling of the whole capsule. In addition, with the use of guar gum, the capsule having excellent heat resistance and moisture resistance can be obtained efficiently without impairing the excellent rupturing feeling.

When the guar gum is used, the ratio in the capsule shell of the guar gum may be, for example, 1 to 50 wt %, preferably 3 to 45 wt %, further preferably 5 to 40 wt %, especially 10 to 35 wt % (e.g., 15 to 30 wt %).

Also when the guar gum is used, the ratio of the guar gum in the shell-forming agent may be, for example, 5 wt % or more (e.g., 8 to 100 wt %), preferably 10 wt % or more (e.g., 15 to 90 wt %), further preferably 20 wt % or more, especially 30 wt % or more (e.g., 35 to 75 wt %).

Furthermore, in the case of the combination of alginic acid or a salt thereof and guar gum (guar gums), for example, the weight ratio (alginic acid or a salt thereof/guar gum) of alginic acid or a salt thereof relative to guar gum may be 95/5 to 5/95 (e.g., 90/10 to 10/90), preferably 85/15 to 15/85 (e.g., 80/20 to 20/80), more preferably around 75/25 to 25/75, usually 70/30 to 10/90 (e.g., 70/30 to 15/85, preferably 70/30 to 20/80, more preferably 70/30 to 25/75).

The capsule shell of the present invention may include, but not particularly limited to, coloring agents. Examples of coloring agents may include, but not limited to, well-known dyes, pigments and the like. The content of them is not particularly limited, as long as it does not impair the effects of the present invention. The commercial products can be used for them.

The capsule shell of the present invention may include, but not particularly limited to, sweeteners. Examples of sweeteners may be, but not particularly limited to, sucralose, acesulfame, aspartame, saccharin, trehalose, sorbitol, sucrose, etc. They can be used either singly or as a mixture of two or more sweeteners. The content of them is not particularly limited, as long as it does not impair the effects of the present invention. The commercial products can be used for them.

The capsule shell of the present invention may further include, but not particularly limited to, if it is needed, plasticizers in order to adjust the crush strength, the distance, the shell ratio, the water content ratio, water activity, etc. In addition, it is easy to get the capsule which has relatively small variation (namely, small SD level) efficiently by using a plasticizer.

The plasticizer may include, but not particularly limited to, for example, polyhydric alcohols such as glycerin, polyethylene glycol, propylene glycol, and polypropylene glycol, etc.; monosaccharides such as grape sugar, fructose, glucose, galactose, etc.; disaccharides such as sucrose, maltose, trehalose, the coupling sugar, etc. and oligosaccharides such as maltooligosaccharide, etc.; sugar alcohols such as sorbitol, maltitol, lactitol, palatinit, xylitol, mannitol, galactitol, etc.; polyvinyl alcohol; triacetin; starch derivatives such as polydextrose, dextrins, maltodextrins, indigestible dextrin, cyclodextrin ($\alpha$ (alpha), $\beta$ (beta), or $\gamma$ (gamma)), etc.; starch; cellulose derivatives such as hydroxypropyl methylcellulose (HPMC), hydroxypropyl cellulose (HPC), methyl cellulose (MC), carboxymethyl cellulose (CMC), etc. These can be used either singly or as a mixture of two or more of them. The commercial products can be used for them, and for example, products made by Matsutani Chemical Industry Co., Ltd. can be used for dextrin, maltodextrin, maltooligosaccharides, and indigestible dextrin. A starch derivative having around 10 to 90 of DE (Dextrose Equivalent, that is, starch decomposition degree) is preferable.

Among these described above, glycerin, starch, starch derivatives, cellulose derivatives and the like may be preferably used.

In addition, the combination of polyhydric alcohol (such as glycerin, etc.) and other plasticizer (or plasticizer other than polyhydric alcohol, for example, at least one plasticizer selected from starch, starch derivatives, and cellulose derivatives, etc.) may be used. The combination of these easily satisfies both an excellent homogenization and a cracking feeling of the capsule in a good balance. In the case of the combination of these, the weight ratio (a polyhydric alcohol/a plasticizer other than the polyhydric alcohol) of a polyhydric alcohol relative to a plasticizer other than the polyhydric alcohol may be around 99/1 to 1/99 (e.g., 95/5 to 5/95), preferably around 90/10 to 10/90 (e.g., 88/12 to 12/88), more preferably around 85/15 to 15/85.

The content ratio of the plasticizer in the capsule shell is, but not particularly limited to, preferably less than 15 wt %, preferably 13 wt % or less, taking the capsule to be obtained having excellent heat resistance and moisture resistance, being easily ruptured under an appropriate pressure imposed by the fingers, and having an enjoyable feeling into consideration unless the shell-forming material (agar, gelatin or carrageenan) is used alone. When the shell-forming material (agar, gelatin or carrageenan) is used alone, the content ratio of the plasticizer in the capsule shell can be, for example, up to around 40 wt %, preferably up to about 35 wt %, and more preferably 30 wt % or less. Further, when gelatin is used alone as shell-forming material, from the viewpoint of compatibility with gelatin, gelatin is preferably 10 wt % or less, preferably 5 wt % or less, and substantially without glycerin is more preferable. The word "substantially without glycerin" here means that glycerin is not blended or a limited amount of glycerin whose effects cannot be detected is blended.

Further, the ratio of the plasticizer can be chosen from around 70 pts·wt. or less (e.g., 1 to 65 pts·wt.) based on 100 pts·wt. of the shell-forming material, and may be, for example, around 50 pts·wt. or less (e.g., 1.5 to 47 pts·wt), preferably around 45 wts·pt. or less (e.g., 2 to 42 pts·wt.), more preferably around 40 pts·wt. or less (e.g., 3 to 40 pts·wt.), especially around 35 pts·wt. or less (e.g., 4 to 35 pts·wt.).

Furthermore, the ratio of the plasticizer can be chosen from around 50 pts·wt. or less (e.g., 0.5 to 45 pts·wt.) based on 100 pts·wt. of the total amount of the shell-forming material and the shell-forming agent, and may be, for example, around 40 pts·wt. or less (e.g., 1 to 35 wt·pt.), preferably around 30 pts·wt. or less (e.g., 1.5 to 28 pts·wt), more preferably around 25 pts·wt. or less (e.g., 2 to 23 pts·wt.), especially around 20 pts·wt. or less (e.g., 3 to 20 pts·wt.).

The capsule of the present invention comprises capsule 3 which has the contents 1 and the capsule shell 2, but it is not particularly limited as long as providing the said constitution essentially, and may be further coated with various coating agents such as zein in order to keep the moisture and disintegration property of the capsule, and then may have a coating layer. The coating agent includes, but not particularly limited to, coating agents known to be generally used, for example, cellulose derivatives (e.g., hydroxypropylmethyl cellulose, methyl cellulose, ethyl cellulose), starch, starch derivatives (e.g. dextrin), methacrylic acid copolymers, shellac, water-soluble shellac, silicone oil, carnauba wax, zein, and the like. These can be used either singly or as a mixture of two or more of them if needed. The commercial products include for example, Opadry, EUDRAGIT, and the like. The thickness of the coating layer is not particularly limited as long as it does not impair the effects of the present invention.

The coating method includes, but not limited to, topping method which is characterized by drying capsule, spraying or applying the coating agent dissolved or dispersed in a volatile solvent, etc. to the dried capsule and vaporizing the volatile solvent; dip method which is characterized by immersing the dried capsule in the coating agent dissolved or dispersed in a volatile solvent, etc., and evaporating the volatile solvent; and kneading method which is characterized by keeping the coating agent dispersed, or suspended in advance in the solution of the capsule shell during preparing the said solution.

The content of the capsule of the present invention is not particularly limited as long as it mainly contains the oily ingredient, but it may consist of oily ingredients only. The oily ingredient of the content of the capsule includes, but not particularly limited to, for example, perfumes, lipophilic solvents and the like. Further, the oily ingredient may be prepared as an emulsion of the oil/water/oil type by using a known material. Furthermore, the said oily ingredient may include a pharmacologically active ingredient as a powder.

In the breakable capsule of the present invention, pharmacologically active ingredients and surfactants are not essential and they may not be included, but as long as they do not impair the effects of the present invention, they may be included. The pharmacologically active ingredient and the surfactant are not limited as long as they do not impair the effects of the present invention, known ones can be used. These can be used either singly or as a mixture of two or more of them. The content of them is not particularly limited as long as it does not impair the effects of the invention. The commercial products can be used for them.

The pharmacologically active ingredients include, but are not particularly limited to, for example, anti-inflammatory agents such as glycyrrhizic acid and its derivatives and salts thereof (e.g., dipotassium glycyrrhizinate, mono-ammonium glycyrrhizinate, etc.), seaprose, semi-alkaline proteinase, serrapeptase, tranexamic acid, proctase, pronase, bromelain, and the like.

The perfumes used in the present invention are not particularly limited as long as they are the oily ingredients, and either natural perfume or synthetic perfume can be used. The synthetic perfumes used in the present invention, are not particularly limited as long as they are used for the purpose of imparting a fragrance or flavor conventionally, for example, esters, alcohols, aldehydes, ketones, phenols, ethers, lactones, hydrocarbons, nitrogen-containing compounds, sulfur-containing compounds, acids and the like described in "Synthetic Perfumes, Chemistry and Product Knowledge" (edited by Indou Motoichi, The Chemical Daily Co., Ltd.), etc. These can be used either singly or as a mixture of two or more of them.

The above esters include, but not particularly limited to, for example, propyl formate, butyl formate, amyl formate, octyl formate, linalyl formate, citronellyl formate, geranyl formate, neryl formate, terpinyl formate, ethyl acetate, isopropyl acetate, isoamyl acetate, cis-3-hexenyl acetate, trans-2-hexenyl acetate, octyl acetate, nonyl acetate, decyl acetate, dodecyl acetate, dimethyl undecadienyl acetate, styrallyl acetate, ocimenyl acetate, myrcenyl acetate, dihydromyrcenyl acetate, linalyl acetate, citronellyl acetate, geranyl acetate, neryl acetate, tetrahydro muguol acetate, lavandulyl acetate, nerolidol acetate, dihydrocuminyl acetate, terpinyl acetate, citryl acetate, nopyl acetate, dihydroterpinyl acetate, 2,4-dimethyl-3-cyclohexenyl methyl acetate, Myraldyl acetate, veticol acetate, decenyl propionate, linalyl propionate, geranyl propionate, neryl propionate, terpinyl propionate, tricyclodecenyl propionate, styrallyl propionate, anisyl propionate, octyl butyrate, neryl butyrate, cinnamyl butyrate, isopropyl isobutyrate, octyl isobutyrate, linalyl isobutyrate, neryl isobutyrate, linalyl isovalerate, terpinyl isovalerate, phenylethyl isovalerate, 2-methyl-2-methylpentyl valerate, methyl 3-hydroxy-hexanoate, 3-hydroxy-ethyl hexanoate, methyl octanoate, octyl octanoate, linalyl octanoate, nonanoic acid methyl, methyl undecylenate, linalyl benzoate, methyl cinnamate, isoprenyl angelate, methyl geranate, triethyl citrate, ethyl acetoacetate, ethyl 2-hexylacetoacetate, ethyl benzylacetoacetate, allyl 2-ethylbutyrate, ethyl 3-hydroxybutyrate, ethyl nonanoate, ethyl decanoate, ethyl 2,4-decadienoate, propyl 2,4-decadienoate, methyl anthranilate, and linalyl anthranilate, ethyl N-methyl-anthranilate, and the like.

The above alcohols include, but not particularly limited to, for example, 3-heptanol, 1-nonanol, 1-undecanol, 2-undecanol, 1-dodecanol, prenol, 10-undecen-1-ol, dihydrolinalool, tetrahydromuguol, myrcenol, dihydromyrcenol, tetrahydromyrcenol, ocimenol, terpineol, hotrienol, 3-thujanol, benzyl alcohol, β-phenylethyl alcohol, α-phenylethyl alcohol, 3-methyl-1-pentanol, 1-heptanol, 2-heptanol, 3-octanol, 1-nonanol, 2-nonanol, 2,6-dimethyl heptanol, 1-decanol, trans-2-hexenol, cis-4-hexenol, methyl trimethyl cyclopentenyl butenol, citronellol, dihydromyrcenol, rhodinol, geraniol, nerol, linalool, tetrahydrolinalool, dimethyl octanol, hydroxy citronellol, isopulegol, menthol, terpineol, dihydroterpineol, carveol, dihydrocarveol, perillyl alcohol, 4-thujanol, myrtenol, α-fenchyl alcohol, farnesol, nerolidole, cedrenol, anise alcohol, hydratropic alcohol, 3-phenylpropyl alcohol, cinnamyl alcohol, amyl cinnamyl alcohol and the like.

The above aldehydes include, but not particularly limited to, for example, acetaldehyde, n-hexanal, n-heptanal, n-octanal, n-nonanal, 2-methyl octanal, 3,5,5-trimethyl hexanal, decanal, undecanal, 2-methyl decanal, dodecanal, tridecanal, tetradecanal, trans-2-hexenal, trans-4-decenal, cis-4-decenal, trans-2-decenal, 10-undecenal, trans-2-undecenal, trans-2-dodecenal, 3-dodecenal, trans-2-tridecenal, 2,4-hexadienal, 2,4-decadienal, 2,4-dodecadienal, 5,9-dimethyl-4,8-decadienal, citral, dimethyl octanal, α-methylene citronellal, citronellyloxyacetaldehyde, myrtenal, neral, α-sinensal or β-sinensal, myrac aldehyde, phenyl acetaldehyde, octanal dimethyl acetal, nonanal dimethyl acetal, decanal dimethyl acetal, decanal diethyl acetal, 2-methyl undecanal dimethyl acetal, citral dimethyl acetal, citral diethyl acetal, citral propylene glycol acetal, n-valeraldehyde, isovaler aldehyde, 2-methyl butanal, 2-pentenal, trans-2-heptenal, trans-2-nonenal, 2,6-dimethyl-5-peptenal, 2,4-undecadienal, trimethyldecadienal, citronellal, hydroxy citronellal, safranal, Vern aldehyde, benzaldehyde, p-isopropylphenyl acetaldehyde, p-methyl hydratropic aldehyde, phenyl propionaldehyde, 2-methyl-3-(4-methylphenyl)propanal, cyclamen aldehyde, cinnamyl aldehyde, salicyl aldehyde, anise aldehyde, p-methylphenoxy acetaldehyde, acetaldehyde diethyl acetal, citronellyl methyl acetal, acetaldehyde 2-phenyl-2,4-pentanediol acetal, 2-hexenal diethyl acetal, cis-3-hexenal diethyl acetal, heptanal diethyl acetal, 2-hexyl-5-methyl-1,3-dioxolane, citronellal cyclomonoglycol acetal, hydroxycitronellal dimethyl acetal, phenyl acetaldehyde dimethyl acetal and the like.

The above ketones include, but not particularly limited to, for example, 2-pentanone, 3-hexanone, 2-heptanone, 3-heptanone, 4-heptanone, 2-octanone, 3-octanone, 2-nonanone, 2-undecanone, methylheptenone, dimethyl octenone, geranyl acetone, farnesyl acetone, 2,3,5-trimethyl-4-cyclohexenyl-1-methyl ketone, nerone, nootkatone, dihydronootkatone, acetophenone, 4,7-dihydro-2-isopentyl-2-methyl-1,3-dioxepin, 2,3-hexadione, 3-nonanone, ethyl isoamyl ketone, diacetyl, amyl cyclopentenone, 2-cyclopentyl cyclopentanone, hexyl cyclopentanone, heptyl cyclopentanone, cis-jasmone, dihydro jasmone, trimethyl pentyl cyclopentanone, 2-(2-(4-methyl)-3-cyclohexen-1-yl)propyl cyclopentanone, damascone, α-dynascone, trimethyl cyclohexenyl butenone, ionone, β-ionone, methyl ionone, allyl ionone, plicatone, cashmeran, 1-carvone, menthone, camphor, p-methylacetophenone, p-methoxyacetophenone, benzylidene acetone, raspberry ketone, methyl naphthyl ketone, benzophenone, furfural acetone, homofuronol, maltol, ethyl maltol, ethyl acetoacetate ethylene glycol ketal and the like.

The above phenols are, but not particularly limited to, for example, thymol, carvacrol, β-naphthol isobutyl ether, anethole, β-naphthol methyl ether, β-naphthol ethyl ether, creosol, veratrole, hydroquinone dimethyl ether, 2,6-dimethoxy phenol, 4-ethyl guaiacol, eugenol, isoeugenol, ethyl isoeugenol, tert-butyl hydroquinone dimethyl ether, and the like.

The above ethers include, but not particularly limited to, for example, decyl vinyl ether, α-terpinyl methyl ether, isoproxen, 2,2-dimethyl-5-(1-methyl-1-propenyl)-tetrahydrofuran, rosefuran, 1,4-cineole, nerol oxide, 2,2,6-trimethyl-6-vinyl tetrahydropyran, methyl hexyl ether, ocimene epoxide, limonene oxide, rhubofix, caryophyllene oxide, linalool oxide, 5-isopropenyl-2-methyl-2-vinyl tetrahydrofuran, nerol oxide, rose oxide, and the like.

The above lactones are, but not particularly limited to, for example, γ-undecalactone, δ-dodecalactone, γ-hexalactone, γ-nonalactone, γ-decalactone, γ-dodecalactone, jasmine lactone, methyl-γ-decalactone, 7-decenolactone, jasmolactone, propylidene phthalide, δ-hexalactone, δ-2-decenolactone, ε-dodecalactone, dihydrocoumarin, coumarin, and the like.

The above hydrocarbons are, but not particularly limited to, for example, ocimene, limonene, α-phellandrene, terpinene, 3-carene, bisabolene, valencene, alloocimene, myrcene, farnesene, α-pinene, β-pinene, camphene, terpinolene, p-cymene, cedrene, β-caryophyllene, cadinene, and the like.

The above nitrogen-containing compounds or sulfur-containing compounds are, but not particularly limited to, for example, methyl anthranilate, ethyl anthranilate, methyl N-methyl anthranilate, methyl N-2'-methyl pentylidene anthranilate, ligantraal, dodecanenitrile, 2-tridecenenitrile, geranyl nitrile, citronellyl nitrile, 3,7-dimethyl-2,6-nonadienonitrile, indole, 5-methyl-3-heptanone oxime, limonenethiol, 1-p-menthene-8-thiol, butyl anthranilate, cis-3-hexenyl anthranilate, phenylethyl anthranilate, cinnamyl anthranilate, dimethyl sulfide, 8-mercaptomenthone, and the like.

The above acids are, but not particularly limited to, for example, acetic acid, propionic acid, butyric acid, valeric acid, hexanoic acid, octanoic acid, decanoic acid, dodecanoic acid, 2-decenoic acid, geranic acid, 2-methylbutyric acid, 2-ethylbutyric acid, phenylacetic acid, cinnamic acid, isobutyric acid, isovaleric acid, 3-methylvaleric acid, 2-hexenoic acid, 2-methyl-2-pentenoic acid, 2-methylheptanoic acid, myristic acid, stearic acid, lactic acid, pyruvic acid, cyclohexanecarboxylic acid, and the like.

The above natural perfumes are, but not particularly limited to, for example, oil such as an orange, neroli, mandarin, petitgrain, bergamot, tangerine, satsuma mandarin orange, cinnamon, *Citrus aurantium* (Bitter orange), *Citrus hassaku* (Hassaku), *Citrus iyo* (Iyokan), lemon, lime, grapefruit, *Citrus junos* (Yuzu), *Citrus sudachi* (Sudachi), *Citrus sphaerocarpa* (Kabosu), sweetie, raspberry, and the like.

In addition, the oil other than the above natural perfumes includes, but not particularly limited to, for example, citronella, elemi, olibanum, marjoram, angelica root, star anise, basil, hay, calamus, caraway, cardamom, pepper, cascarilla, ginger, sage, clary sage, clove, coriander, eucalyptus, fennel, pimento, juniper, fenugreek, laurel, mace, Japanese ceder, *cnidium officinale*, almond, anise, artemisia, alfalfa, apricot, ambrette, rush, strawberry, fig, ylang-ylang, wintergreen, Japanese apricot, elder, Japanese pagoda tree, oakmoss, allspice, orris, redcurrant, cassie, chamomile, galanga, Chinese quince, gambir, guava, gooseberry, camphor tree, gardenia, cubeb, cumin, cranberry, cola, Japanese pepper, sandarac, sandalwood, red sandalwood, perilla, civet, jasmine, ginseng, cinnamon, starfruit, styrax, spearmint, apple mint, peppermint, geranium, thyme, davana, tansy, tangerine, champac, tuberose, camellia, dittany, tolu balsam, tonka beans, nuts, jujube, nutmeg, nandin, niaouli, carrot, violet, pineapple, hibiscus, honey, Japanese mint, passion fruit, vanilla, rose, coffee, hyssop, Japanese cypress (hinoki), fusel oil, buchu, pepino, verbena, rosewood, papaw, boldo, boronia, pine, mango, beeswax, mimosa, milfoil, musk, maple, melissa, melon, peach, yara yara, lavender, litsea, linden, rue, wax apple, rosemary, lovage, and the like.

The lipophilic solvent used for the content of the capsule of the present invention is not particularly limited, but the lipophilic solvent ordinary used in food, pharmaceutical products or the cosmetics industry can be used. Examples include triglyceride particularly medium-chain triglyceride (e.g., caprylic acid and triglyceride of caprylic acid), vegetable oil (e.g., olive oil, sunflower oil, corn oil, peanut oil, grape seed oil, wheat germ oil, rapeseed oil, jojoba oil, safflower oil), mineral oil, a silicone oil or mixture of these and triglyceride, fatty acid (e.g., eicosapentaenoic acid (EPA), docosahexaenoic acid (DHA)), fatty acid ester (e.g., myristate isopropyl), Sucrose Acetate Iso-Butylate (SAIB), liquid paraffin, squalene and the like. These can be used either singly or as a mixture of two or more of them. The content of them is not particularly limited as long as it does not impair the effects of the invention.

The manufacturing method of the breakable capsule of the present invention is not particularly limited, but can be selected from a well-known manufacturing method appropriately, and for example, the methods described in Japanese Patent No. 5047285 and Japanese Translation of PCT International Application Publication No. 10-506841 can be used. Specifically, these include the dripping methods (the seamless capsule method) with the double or multiplex (more than triple) nozzles. According to this method, the capsule can be prepared by filling the capsule shell with the capsule content, and followed by forming and drying the capsule. At this stage, the adjustment of a crush strength, distance, the water activity of the capsule shell, the water content of the capsule shell and the like can be conducted after forming the capsule by controlling appropriately the drying condition (for example, drying temperature, relative humidity during the drying process, and drying time) and followed by decreasing the fluid volume of the capsule shell. In order to obtain the thickness of the capsule with the desired effects of the present invention, since the rotary die method is inferior to the seamless capsule method from the viewpoint of homogeneity of the shell, when the shell is too thick, the rotary die cannot be used.

In the said the dripping methods, for example, as shown in FIG. 2, composite nozzle device which is aligned in a properly substantially concentric circle is used. For example, the composite nozzle device has the following parts: inner nozzle 4 which receives and distributes the capsule contents to be supplied to the inner nozzle 4 from Arrow A, and outer nozzle 5 which receives and distributes a capsule shell liquid to be supplied to the outer nozzle 5 from Arrow B, wherein inner nozzle 4 and outer nozzle 5 is aligned in a substantially concentric circle. By using the composite nozzle device, the capsule content is supplied to the inner nozzle 1 from Arrow A; the said capsule content is discharged from the port of the inner nozzle 4; the capsule shell liquid is supplied to the outer nozzle 5 from B; and the said capsule shell liquid is discharged the capsule shell liquid from the discharge port of the outer nozzle 5. Each of the capsule content and capsule shell liquid is discharged into an oily liquid or gas at a constant speed by pump or gravity from inner nozzle 4 and from outer nozzle 5 at the same time, forming sort of the coaxial flow in the carrier stream 6 which flows downstream, being added physical forces such as vibration and the liquid discharging is cut at the regular intervals; by interfacial tension between the capsule shell liquid and the gas or oily liquid or surface tension, making the liquid spherical and making the membrane layer gelling by cooling, and then, a wet capsule is formed. Capsule shell material 2 surrounds the extruded capsule contents 1 to form a capsule 3. Here, the process does not include the gas to the content of the capsule of the present invention.

As the above interface or surface tension is not particularly limited to, but for example, 15 to 50 mN/m is desirable in an interface with capsule shell liquid and the content fluid of capsule. For example, Sigma 702 made by KSV Instruments (Finland) is used for the measurement of an interface or the surface tension.

In the present invention, it is preferred that the adjustment of temperature conditions in the vicinity of the multiple nozzle is appropriately controlled during capsule manufacture. It is preferred that in the vicinity of the multiple nozzle of the seamless soft capsule manufacturing apparatus, for example, the temperatures should be set as follows:

(1) To control the temperature of the capsule content to 5 to 25° C. (more preferably 12 to 22° C.) with setting value +/−2° C. (more preferably +/−1° C.) in the range.
(2) To control the temperature of the capsule shell to 50 to 99° C. (more preferably 60 to 95° C.) with setting value +/−2° C. (more preferably +/−1° C.) in the range.
In addition, when a lipophilic solvent is added to the oily ingredient of the capsule content, (3) To control the lipophilic solvent of the capsule content to 1 to 25° C. (more preferably 5 to 20° C.) with setting value +/−1° C. (more preferably +/−0.5° C.) in the range is preferable.

Further adding to the conditions above, (4) the difference between the temperature of the capsule content and the temperature of the capsule shell liquid to be 25° C. or more and 94° C. or less (more preferably 38° C. or more and 85° C. or less) is more preferable.

Further, when a lipophilic solvent is added to the oily ingredient of the capsule content, (5) the difference between the temperature of the capsule shell liquid and the temperature of the lipophilic solvent to be 25° C. or more and 94° C. or less (more preferably 38° C. or more and 85° C. or less) is more preferable.

Furthermore, after passing through the nozzle, when gelling the shell layer by cooling, it is cooled by the cooling oil. The cooling temperature in the cooling oil, for example, is around 5 to 20° C.

The temperature above conditions (1) to (5) can be appropriately selected or combined by those skilled in the art according to the quality required for the seamless capsule. The temperature control methods described above can be easily conducted by those skilled in the art, for example, in combining the feedback control with PID control, but are not limited to these control methods.

The capsule shell liquid may be prepared by dissolving the shell-forming agent in a solvent. The solvent is not particularly limited as long as it does not impair the effects of the present invention, but it includes, for example, water, alcohols such as ethanol and the like, water is preferred. When the shell-forming agent is dissolved in a solvent, the heating treatment is preferable. The heating temperature is, but not particularly limited to, around 60 to 100° C., more preferably around 70 to 95° C. The viscosity of the capsule shell liquid (mixed solution) at 90° C. is not particularly limited, but 70 to 500 mPa·s is preferable, 80 to 300 mPa·s is more preferable, and 90 to 200 mPa·s is further preferable, from the viewpoint of obtaining a combination of the constitution of the present invention and obtaining the effects of the disintegration property of the capsule (homogeneity of the shell). The above viscosity is a value which is measured by using B-type viscometer (Manufacturer: BROOK FIELD, MODEL: LVDVE115). When the viscosity of the capsule shell liquid is more than 500 mPa·s, the capsule of the present invention cannot be obtained.

Additionally, when a capsule to be obtained is cooled, the cooling temperature is, but not limited to, usually 20° C. or less and preferably 10° C. or less. The cooling time is, but not particularly limited to, usually around 10 minutes to 30 hours.

After a wet capsule is prepared by methods described above, it is dried to give a dried capsule, and the drying is typically carried out by using, for example, "rotary drum dryer" with a ventilator, and as other methods, a fluid-type instrument can be used for drying a small capsules such as a seamless capsule while blowing up and fluidizing the small capsule. The drying temperature may include, but not particularly limited to, around 20 to 50° C.

As long as the effects of the present invention are exhibited, the present invention includes various embodiments where constitutions described above are combined within the scope of the present invention.

EXAMPLES

The present invention is described below in more detail with reference to Examples, but the present invention is not limited to these Examples, and therefore various modifications can be made by a person with ordinary skill in the art without departing from the technical ideas of the present invention.

The capsule outer diameter of the following Examples and Reference examples is a value measured by using digital vernier calipers made by Mitutoyo Corporation Ltd.) (product name: Quick mini 25, model number: PK-0510SU, the measurement range: 0 to 25 mm), at room temperature (22 to 23° C.), 45 to 53% RH. The crush strength of the capsule after drying is a value measured by using Rheo Meter: CR-500DX made by Sun Scientific Co., Ltd., at room temperature (22 to 23° C.), 60% RH. A water activity of the capsule shell is a value measured by using a water activity measurement system (Palm Aw1 type) made by Rotronic AG, 22° C., 60% RH. The water content ratio in the capsule shell is calculated by measuring the dry weight after treatment with 110° C., 120 minutes from the state of dry weight at 110° C., 120 minutes based on the state at 22° C., 60% RH. The capsule shell thickness is a value measured by using a digital microscope made by Keyence Corporation (product name: VHX-900, using a proofreading scale of 10 μm). Every value of the distance at 22° C., 80% RH is measured by using Rheo Meter: CR-500DX made by Sun Scientific Co., Ltd.

The used materials in the following Examples and Reference examples are shown below. Powdered agar was mixed to commercial products derived from red algae seaweed, which has jelly strength: 750+/−100 g/cm$^2$ made by Ina food industry Co., Ltd., and which has jelly strength: 1000+/−100 g/cm$^2$, made by Ina food industry Co., Ltd. The above jelly strength is a value at 1.5% concentration. Carrageenan was used kappa carrageenan (product name: SATIAGEL ME4: Cargill Japan Ltd.), the total amount of 2-propanol and methanol: 0.10% or less, pH: 8.0 to 11.0, viscosity: 5.0 mPa·s or more, according to Food Additives compendium described in General Test Procedures with using the rotation viscometer method). Dextrin that is, a starch decomposition product (maltodextrin) was used maltodextrin with DE (dextrose equivalent) 10 or more (Matsutani Chemical Industry Co., Ltd.). Refined guar gum A was used FG-50 (SOMAR Corp.). Refined guar gum B was used RG-100 (MRC polysaccharide Co., Ltd.). An enzymolysis product of guar gum was used Sun fiber (Taiyo Kagaku Co., Ltd.). Commercially available products with the viscosity of 300 mPa·s or less were used for sodium alginate and calcium alginate. Commercially available products with a bloom strength 270 (product name: 270FG, Rousselot) were used for fish gelatin. Commercially available products with a bloom strength 250 (brand name: BCN250SC, Nitta Gelatin Inc.) were used for pig gelatin.

The capsule size (outer diameter) of the following Examples and Reference examples was adjusted by changing the number of rotations of the pump at the time of the production (changing the sending amount of the liquid). Also, the feeling of crushing the capsule was evaluated by pressuring it by the fingers in terms of the capsule of the following Examples and Reference examples.

For the quality of the capsule, the capsule described in Examples and Reference examples below are evaluated in the following evaluation standards.

Excellent: easily and pleasingly ruptured under the pressure imposed by the fingers.
Good: easily ruptured and felt hardness slightly under the pressure imposed by the fingers.
Poor: ruptured, but ruptured under the pressure imposed by the fingers with high pressure.
Fair: not ruptured under the high pressure imposed by the fingers or ruptured, but with high pressure which may give a pain to the fingers under the pressure imposed by the fingers.

Example 1

Kappa carrageenan, powdered agar, guar gum, sodium alginate, glycerin, Food Blue No. 1 and water were mixed so that a capsule to be obtained would be the ratio described in the following Table 1 and the mixture was dissolved at 95° C. (the viscosity of the mixed liquid: 124 mPa·s), and after defoaming, it was allowed to stand to give the capsule shell liquid.

TABLE 1

| Materials of capsule shell | Content Ratio (weight %) |
| --- | --- |
| Kappa carrageenan | 19.0 |
| Powdered agar | 26.0 |
| Enzymolysis product of guar gum | 23.0 |
| Sodium alginate | 23.0 |
| Glycerin | 8.0 |
| Food Blue No. 1 | 1.0 |
| Total | 100.0 |

The capsule was prepared by mixing the said capsule shell liquid with vanilla oil as a capsule content in the seamless capsule manufacturing apparatus (product name: SPHEREX (registered trademark, made by Freund Corporation), followed by controlling the temperature of capsule contents to 20° C.+/−2° C. near the multiplex nozzle, controlling the temperature of the capsule shell liquid to 70° C.+/−2° C., and then cooling with cooling oil (around 10° C.). Then, treating the said capsule with drying (25° C., 50% or less of humidity RH) gave the seamless capsule. The properties of the obtained capsule were measured. The results are shown in the following Table 18.

The obtained capsule was translucent and strong bluish purple to strong purplish blue. The obtained capsule was taken and imposed the pressure by the fingers to be ruptured easily with a snap, where the cracking sound and feeling of the capsule could be enjoyed. In addition, sweet vanilla scent can be also enjoyed.

Example 2

The capsule described in Example 1 was coated to be a 2% weight per capsule total weight by using 10% diluted solution of zein (product name: Kobayashi Zein D P, Kobayashi Perfumery Co., Ltd.) according to the known methods. The properties of the obtained capsule were measured. The results are shown in the following Table 18.

The obtained capsule was translucent and strong bluish purple to strong purplish blue. The obtained capsule was taken and placed the pressure by the fingers to be ruptured easily with a snap, where the cracking sound and feeling of the capsule could be enjoyed. In addition, sweet vanilla scent can be also enjoyed.

Example 3

The mixed liquid was prepared so that a capsule to be obtained would be according to the formulation described in the following Table 2 and was dissolved at 95° C. (the viscosity of the mixed liquid: 151 mPa·s), and after defoaming, it was allowed to stand to give the capsule shell liquid.

TABLE 2

| Materials of capsule shell | Content Ratio (weight %) |
|---|---|
| Kappa carrageenan | 25.0 |
| Powdered agar | 25.5 |
| Refined guar gum B | 17.0 |
| Sodium alginate | 17.0 |
| Dextrin | 9.5 |
| Glycerin | 5.0 |
| Food Red No. 1 | 1.0 |
| Total | 100.0 |

The capsule was prepared by mixing the above capsule shell liquid with orange oil as a capsule content in the seamless capsule manufacturing apparatus (product name: SPHEREX (registered trademark) made by Freund Corporation), followed by controlling the temperature of the capsule content to 18° C.+/−2° C. near the multiplex nozzle, controlling the temperature of capsule shell liquid to 73° C.+/−2° C., and then cooling with cooling oil (around 10° C.). Then, treating the said capsule with drying in a manner similar to Example 1 gave the said seamless capsule. The properties of the obtained capsule were measured. The results are shown in the following Table 18.

The obtained capsule was translucent and bright red. The obtained capsule was taken and imposed the pressure by the fingers to be ruptured easily with a snap, where the cracking sound and feeling of the capsule could be enjoyed. In addition, orange scent can be also enjoyed.

Example 4

The mixed liquid was prepared so that a capsule to be obtained would be according to the formulation described in the following Table 3 and was dissolved at 95° C. (the viscosity of the mixed liquid: 175 mPa·s), and after defoaming, it was allowed to stand to give the capsule shell liquid.

TABLE 3

| Materials of capsule shell | Content Ratio (weight %) |
|---|---|
| Kappa carrageenan | 24.0 |
| Powdered agar | 24.0 |
| Enzymolysis product of guar gum | 24.0 |
| Sodium alginate | 13.0 |
| Dextrin | 9.0 |
| Glycerin | 5.0 |
| Food Yellow No. 1 | 1.0 |
| Total | 100.0 |

The capsule was prepared by mixing the above capsule shell liquid with 1-menthol 30% MCT solution as a capsule content in the seamless capsule manufacturing apparatus (product name: SPHEREX (registered trademark) made by Freund Corporation), followed by controlling the temperature of the capsule content to 22° C.+/−2° C. near the multiplex nozzle, controlling the temperature of capsule shell liquid to 80° C.+/−2° C., and then cooling with cooling oil (around 10° C.). Then, treating the said capsule with drying in a manner similar to Example 1 gave the said seamless capsule. The properties of the obtained capsule were measured. The results are shown in the following Table 18.

The obtained capsule was translucent and was bright yellow. The obtained capsule was taken and imposed the pressure by the fingers to be ruptured easily with a snap, where the cracking sound and feeling of the capsule could be enjoyed. In addition, refreshing menthol scent can be also enjoyed.

Example 5

The mixed liquid was prepared so that a capsule to be obtained would be according to the formulation described in the following Table 4 and was dissolved at 95° C. (the viscosity of the mixed liquid: 119 mPa·s), and after defoaming, it was allowed to stand to give the capsule shell liquid.

TABLE 4

| Materials of capsule shell | Content Ratio (weight %) |
|---|---|
| Kappa carrageenan | 19.0 |
| Powdered agar | 26.0 |
| Refined guar gum A | 24.0 |
| Sodium alginate | 24.0 |
| Glycerin | 6.0 |
| Food Red No. 1 | 1.0 |
| Total | 100.0 |

The capsule was prepared by mixing the above capsule shell liquid with rose oil as a capsule content in the seamless capsule manufacturing apparatus (product name: SPHEREX (registered trademark) made by Freund Corporation), followed by controlling the temperature of the capsule content to 16° C.+/−2° C. near the multiplex nozzle, controlling the temperature of capsule shell liquid to 78° C.+/−2° C., and then cooling with cooling oil (around 10° C.). Then, treating the said capsule with drying in a manner similar to Example 1 gave the said seamless capsule. The properties of the obtained capsule were measured. The results are shown in the following Table 18.

The obtained capsule was translucent and bright red. The obtained capsule was felt slight hardness, but when it was imposed the pressure by the fingers, it was easily broken with a snap, where the cracking sound and feeling of the capsule could be enjoyed. In addition, rose scent could be also enjoyed.

Example 6

The mixed liquid was prepared so that a capsule to be obtained would be according to the formulation described in the following Table 5 and was dissolved at 95° C. (the viscosity of the mixed liquid: 210 mPa·s), and after defoaming, it was allowed to stand to give the capsule shell liquid.

TABLE 5

| Materials of capsule shell | Content Ratio (weight %) |
|---|---|
| Kappa carrageenan | 23.0 |
| Powdered agar | 23.0 |
| Refined guar gum B | 23.0 |
| Sodium alginate | 17.0 |
| Dextrin | 10.0 |
| Glycerin | 3.5 |
| Food Red No. 1 | 0.5 |
| Total | 100.0 |

The capsule was prepared by mixing the above capsule shell liquid with cinnamon oil as a capsule content in the seamless capsule manufacturing apparatus (product name:

SPHEREX (registered trademark) made by Freund Corporation), followed by controlling the temperature of the capsule content to 20° C.+/−2° C. near the multiplex nozzle, controlling the temperature of capsule shell liquid to 70° C.+/−2° C., and then cooling with cooling oil (around 10° C.). Then, treating the said capsule with drying in a manner similar to Example 1 gave the said seamless capsule. The properties of the obtained capsule were measured. The results are shown in the following Table 18.

The obtained capsule was translucent and was bright red. The obtained capsule was taken and imposed the pressure by the fingers to be ruptured easily with a snap, where the cracking sound and feeling of the capsule could be enjoyed. In addition, cinnamon scent can be also enjoyed.

Example 7

The mixed liquid was prepared so that a capsule to be obtained would be according to the formulation described in the following Table 6 and was dissolved at 95° C. (the viscosity of the mixed liquid: 330 mPa·s), and after defoaming, it was allowed to stand to give the capsule shell liquid.

TABLE 6

| Materials of capsule shell | Content Ratio (weight %) |
|---|---|
| Kappa carrageenan | 26.0 |
| Powdered agar | 22.0 |
| Enzymolysis product of guar gum | 22.0 |
| Sodium alginate | 21.0 |
| Glycerin | 8.0 |
| Food Green No. 1 | 1.0 |
| Total | 100.0 |

The capsule was prepared in a similar manner to Example 1 proviso by using the said capsule shell liquid and raspberry oil as the capsule content. The properties of the obtained capsule were measured. The results are shown in the following Table 18.

The obtained capsule was translucent and bright green. The obtained capsule was taken and imposed the pressure by the fingers to be ruptured easily with a snap, where the cracking sound and feeling of the capsule could be enjoyed. In addition, a raspberry scent can be also enjoyed.

Example 8

The mixed liquid was prepared so that a capsule to be obtained would be according to the formulation described in the following Table 7 and was dissolved at 95° C. (the viscosity of the mixed liquid: 200 mPa·s), and after defoaming, it was allowed to stand to give the capsule shell liquid.

TABLE 7

| Materials of capsule shell | Content Ratio (weight %) |
|---|---|
| Kappa carrageenan | 23.0 |
| Powdered agar | 29.0 |
| Enzymolysis product of guar gum | 23.0 |
| Sodium alginate | 17.0 |
| Glycerin | 7.0 |
| Food Yellow No. 1 | 1.0 |
| Total | 100.0 |

The capsule was prepared in a similar manner to Example 1 proviso by using the said capsule shell liquid and peppermint oil as the capsule content. The properties of the obtained capsule were measured. The results are shown in the following Table 18.

The obtained capsule was translucent and bright yellow. The obtained capsule was taken and imposed the pressure by the fingers to be ruptured easily with a snap, where the cracking sound and feeling of the capsule could be enjoyed. In addition, a peppermint scent can be also enjoyed.

Example 9

The mixed liquid was prepared so that a capsule to be obtained would be according to the formulation described in the following Table 8 and was dissolved at 95° C. (the viscosity of the mixed liquid: 95 mPa·s), and after defoaming, it was allowed to stand to give the capsule shell liquid.

TABLE 8

| Materials of capsule shell | Content Ratio (weight %) |
|---|---|
| Kappa carrageenan | 25.0 |
| Powdered agar | 19.0 |
| Enzymolysis product of guar gum | 27.0 |
| Calcium alginate | 22.0 |
| Glycerin | 6.5 |
| Food Red No. 1 | 0.5 |
| Total | 100.0 |

The capsule was prepared in a similar manner to Example 1 proviso by using the said capsule shell liquid and coffee oil as the capsule content. The properties of the obtained capsule were measured. The results are shown in the following Table 18.

The obtained capsule was translucent and bright red. The obtained capsule was taken and imposed the pressure by the fingers to be ruptured easily with a snap, where the cracking sound and feeling of the capsule could be enjoyed. In addition, coffee scent can be also enjoyed.

Example 10

The capsule described in Example 1 was coated to be a 2% weight per capsule total weight by using 0.5% eudragit solution (product name: EUDRAGIT EPO, Rohm GmbH & Co. KG) according to the known methods. The properties of the obtained capsule were measured. The results are shown in the following Table 18.

Example 11

The mixed liquid was prepared so that a capsule to be obtained would be according to the formulation described in the following Table 9 and was dissolved at 95° C. (the viscosity of the mixed liquid: 132 mPa·s), and after defoaming, it was allowed to stand to give the capsule shell liquid.

TABLE 9

| Materials of capsule shell | Content Ratio (weight %) |
|---|---|
| Kappa carrageenan | 25.0 |
| Powdered agar | 23.0 |
| Enzymolysis product of guar gum | 23.0 |

TABLE 9-continued

| Materials of capsule shell | Content Ratio (weight %) |
| --- | --- |
| Sodium alginate | 22.0 |
| Glycerin | 6.0 |
| Food Green No. 1 | 1.0 |
| Total | 100.0 |

The capsule was prepared in a similar manner to Example 1 proviso by using the said capsule shell liquid and lemon oil as the capsule content. The properties of the obtained capsule were measured. The results are shown in the following Table 18.

The obtained capsule was translucent and bright green. The obtained capsule was taken and imposed the pressure by the fingers to be ruptured easily with a snap, where the cracking sound and feeling of the capsule could be enjoyed. In addition, a lemon scent can be also enjoyed.

Example 12

The mixed liquid was prepared so that a capsule to be obtained would be according to the formulation described in the following Table 10 and was dissolved at 95° C. (the viscosity of the mixed liquid: 192 mPa·s), and after defoaming, it was allowed to stand to give the capsule shell liquid.

TABLE 10

| Materials of capsule shell | Content Ratio (weight %) |
| --- | --- |
| Kappa carrageenan | 18.0 |
| Powdered agar | 32.0 |
| Enzymolysis product of guar gum | 26.0 |
| Calcium alginate | 16.0 |
| Glycerin | 7.0 |
| Food Green No. 1 | 1.0 |
| Total | 100.0 |

The capsule was prepared in a similar manner to Example 1 proviso by using the said capsule shell liquid and jasmine oil as the capsule content. The properties of the obtained capsule were measured. The results are shown in the following Table 18.

The obtained capsule was translucent and bright green. The obtained capsule was taken and imposed the pressure by the fingers to be ruptured easily with a snap, where the cracking sound and feeling of the capsule could be enjoyed. In addition, jasmine scent can be also enjoyed.

Example 13

The mixed liquid was prepared so that a capsule to be obtained would be according to the formulation described in the following Table 11 and was dissolved at 95° C. (the viscosity of the mixed liquid: 173 mPa·s), and after defoaming, it was allowed to stand to give the capsule shell liquid.

TABLE 11

| Materials of capsule shell | Content Ratio (weight %) |
| --- | --- |
| Kappa carrageenan | 22.0 |
| Powdered agar | 22.0 |
| Refined guar gum A | 23.0 |
| Sodium alginate | 19.0 |

TABLE 11-continued

| Materials of capsule shell | Content Ratio (weight %) |
| --- | --- |
| Dextrin | 9.0 |
| Glycerin | 5.0 |
| Total | 100.0 |

The capsule was prepared in a similar manner to Example 1 proviso by using the said capsule shell liquid and bergamot oil as the capsule content. The properties of the obtained capsule were measured. The results are shown in the following Table 18.

The obtained capsule was translucent. The obtained capsule was taken and imposed the pressure by the fingers to be ruptured easily with a snap, where the cracking sound and feeling of the capsule could be enjoyed. In addition, bergamot scent can be also enjoyed.

Example 14

The mixed liquid was prepared so that a capsule to be obtained would be according to the formulation described in the following Table 12 and was dissolved at 95° C. (the viscosity of the mixed liquid: 131 mPa·s), and after defoaming, it was allowed to stand to give the capsule shell liquid.

TABLE 12

| Materials of capsule shell | Content Ratio (weight %) |
| --- | --- |
| Kappa carrageenan | 18.0 |
| Powdered agar | 25.5 |
| Enzymolysis product of guar gum | 23.0 |
| Sodium alginate | 18.0 |
| Dextrin | 9.5 |
| Glycerin | 5.0 |
| Food Blue No. 1 | 1.0 |
| Total | 100.0 |

The capsule was prepared in a similar manner to Example 1 proviso by using the said capsule shell liquid and chamomile oil as the capsule content. The properties of the obtained capsule were measured. The results are shown in the following Table 18.

The obtained capsule was translucent and bright blue. The obtained capsule was taken and imposed the pressure by the fingers to be ruptured easily with a snap, where the cracking sound and feeling of the capsule could be enjoyed. In addition, chamomile scent can be also enjoyed.

Example 15

The mixed liquid was prepared so that a capsule to be obtained would be according to the formulation described in the following Table 13 and was dissolved at 95° C. (the viscosity of the mixed liquid: 275 mPa·s), and after defoaming, it was allowed to stand to give the capsule shell liquid.

TABLE 13

| Materials of capsule shell | Content Ratio (weight %) |
| --- | --- |
| Kappa carrageenan | 16.0 |
| Powdered agar | 28.5 |
| Enzymolysis product of guar gum | 23.0 |

TABLE 13-continued

| Materials of capsule shell | Content Ratio (weight %) |
| --- | --- |
| Sodium alginate | 17.0 |
| Dextrin | 10.5 |
| Glycerin | 4.0 |
| Food Blue No. 1 | 1.0 |
| Total | 100.0 |

The capsule was prepared in a similar manner to Example 1 proviso by using the said capsule shell liquid and rosemary oil as the capsule content. The properties of the obtained capsule were measured. The results are shown in the following Table 18.

The obtained capsule was translucent and bright blue. The obtained capsule was taken and imposed the pressure by the fingers to be ruptured easily with a snap, where the cracking sound and feeling of the capsule could be enjoyed. In addition, rosemary scent can be also enjoyed.

Example 16

The mixed liquid was prepared so that a capsule to be obtained would be according to the formulation described in the following Table 14 and was dissolved at 95° C. (the viscosity of the mixed liquid: 168 mPa·s), and after defoaming, it was allowed to stand to give the capsule shell liquid.

TABLE 14

| Materials of capsule shell | Content Ratio (weight %) |
| --- | --- |
| Fish gelatin | 64.5 |
| Dextrin | 30.5 |
| Glycerin | 4.0 |
| Food Red No. 1 | 1.0 |
| Total | 100.0 |

The capsule was prepared in a similar manner to Example 1 proviso by using the said capsule shell liquid and cranberry oil as the capsule content. The properties of the obtained capsule were measured. The results are shown in the following Table 18.

The obtained capsule was translucent and bright red. The obtained capsule was taken and imposed the pressure by the fingers to be ruptured easily with a snap, where the cracking sound and feeling of the capsule could be enjoyed. In addition, cranberry scent can be also enjoyed.

Example 17

The mixed liquid was prepared so that a capsule to be obtained would be according to the formulation described in the following Table 15 and was dissolved at 95° C. (the viscosity of the mixed liquid: 130 mPa·s), and after defoaming, it was allowed to stand to give the capsule shell liquid.

TABLE 15

| Materials of capsule shell | Content Ratio (weight %) |
| --- | --- |
| Fish gelatin | 62.0 |
| Polydextrose | 33.0 |
| Glycerin | 4.0 |
| Food Red No. 1 | 1.0 |
| Total | 100.0 |

The capsule was prepared in a similar manner to Example 1 proviso by using the said capsule shell liquid and ginger oil as the capsule content. The properties of the obtained capsule were measured. The results are shown in the following Table 18.

The obtained capsule was translucent and bright red. The obtained capsule was taken and imposed the pressure by the fingers to be ruptured easily with a snap, where the cracking sound and feeling of the capsule could be enjoyed. In addition, ginger scent can be also enjoyed.

Example 18

The mixed liquid was prepared so that a capsule to be obtained would be according to the formulation described in the following Table 16 and was dissolved at 95° C. (the viscosity of the mixed liquid: 150 mPa·s), and after defoaming, it was allowed to stand to give the capsule shell liquid.

TABLE 16

| Materials of capsule shell | Content Ratio (weight %) |
| --- | --- |
| Fish gelatin | 64.0 |
| Dextrin | 27.0 |
| Polydextrose | 8.0 |
| Food Red No. 1 | 1.0 |
| Total | 100.0 |

The capsule was prepared in a similar manner to Example 1 proviso by using the said capsule shell liquid and cardamom oil as the capsule content. The properties of the obtained capsule were measured. The results are shown in the following Table 18.

The obtained capsule was translucent and was bright red. The obtained capsule was taken and imposed the pressure by the fingers to be ruptured easily with a snap, where the cracking sound and feeling of the capsule could be enjoyed. In addition, cardamom scent can be also enjoyed.

Example 19

The mixed liquid was prepared so that a capsule to be obtained would be according to the formulation described in the following Table 17 and was dissolved at 95° C. (the viscosity of the mixed liquid: 180 mPa·s), and after defoaming, it was allowed to stand to give the capsule shell liquid.

TABLE 17

| Materials of capsule shell | Content Ratio (weight %) |
| --- | --- |
| Pig gelatin | 58.0 |
| Dextrin | 21.0 |
| Enzymolysis product of guar gum | 6.0 |
| Sodium alginate | 9.0 |
| Glycerin | 5.0 |
| Food Red No. 1 | 1.0 |
| Total | 100.0 |

The capsule was prepared in a similar manner to Example 1 proviso by using the said capsule shell liquid and spearmint oil as the capsule content. The properties of the obtained capsule were measured. The results are shown in the following Table 18.

The obtained capsule was translucent and was bright red. The obtained capsule was taken and imposed the pressure by the fingers to be ruptured easily with a snap, where the cracking sound and feeling of the capsule could be enjoyed. In addition, spearmint scent can be also enjoyed.

TABLE 18

| | Outer diameter of capsule (mm) | Shell thickness (μm) Average | Shell thickness (μm) SD | Shell ratio (%) | Total weight of capsule (mg) | Shell weight (mg) | 22° C., 60% Crush strength (g) | 22° C., 60% Crush strength SD | 22° C., 60% Crush strength (X) | Water content (%) | 22° C., 60% Shell AW |
|---|---|---|---|---|---|---|---|---|---|---|---|
| Example 1 | 3.5 | 43 | 6.65 | 8.2 | 22 | 1.8 | 1311 | 175 | 374.6 | 14.0 | 0.58 |
| Example 2 | 3.5 | 49 | 2.81 | 8.2 | 22 | 1.8 | 1138 | 280 | 325.1 | 15.5 | 0.58 |
| Example 3 | 3.7 | 41 | 2.72 | 10 | 29 | 2.9 | 1452 | 180 | 392.4 | 14.5 | 0.59 |
| Example 4 | 4.5 | 43 | 10.80 | 7.5 | 44 | 3.3 | 1595 | 225 | 354.4 | 15.3 | 0.58 |
| Example 5 | 2.8 | 28 | 3.78 | 8.2 | 12 | 1.0 | 982 | 121 | 350.7 | 15.1 | 0.59 |
| Example 6 | 2.8 | 41 | 5.23 | 10 | 12 | 1.2 | 1100 | 159 | 392.9 | 14.2 | 0.58 |
| Example 7 | 3.5 | 40 | 4.90 | 10 | 22 | 2.2 | 1322 | 105 | 377.7 | 13.0 | 0.54 |
| Example 8 | 3.5 | 43 | 4.44 | 7.6 | 22 | 1.7 | 1145 | 153 | 327.1 | 14.1 | 0.58 |
| Example 9 | 3.5 | 42 | 8.19 | 10 | 22 | 2.2 | 1355 | 188 | 387.1 | 13.1 | 0.58 |
| Example 10 | 3.5 | 48 | 7.22 | 10 | 22 | 2.2 | 1471 | 206 | 420.3 | 14.1 | 0.59 |
| Example 11 | 5.0 | 48 | 4.89 | 10 | 60 | 6.0 | 2105 | 248 | 421.0 | 10.6 | 0.58 |
| Example 12 | 7.0 | 58 | 6.90 | 7 | 73 | 5.1 | 2754 | 301 | 393.4 | 14.8 | 0.58 |
| Example 13 | 3.5 | 50 | 6.23 | 11 | 22 | 2.4 | 1656 | 228 | 473.1 | 13.9 | 0.57 |
| Example 14 | 1.0 | 27 | 1.81 | 15 | 0.5 | 0.1 | 236 | 55 | 236.0 | 14.2 | 0.60 |
| Example 15 | 2.0 | 38 | 3.27 | 15 | 4 | 0.6 | 560 | 117 | 280.0 | 14.7 | 0.59 |
| Example 16 | 3.5 | 31 | 5.23 | 7 | 22 | 1.5 | 1047 | 192 | 299.1 | 14.1 | 0.58 |
| Example 17 | 3.5 | 34 | 4.91 | 7 | 22 | 1.5 | 991 | 224 | 283.1 | 13.9 | 0.58 |
| Example 18 | 3.5 | 40 | 3.66 | 8 | 22.5 | 1.8 | 1250 | 207 | 357.1 | 14.7 | 0.58 |
| Example 19 | 3.5 | 42 | 4.52 | 8 | 22.5 | 1.8 | 1411 | 238 | 403.1 | 15.8 | 0.59 |

| | 22° C., 80% Distance (mm) | 22° C., 80% SD | Distance/Outer diameter | Capsule quality | Crushing feeling |
|---|---|---|---|---|---|
| Example 1 | 1.4 | 0.2 | 0.40 | Excellent | appropriately hard and easily crushed |
| Example 2 | 1.4 | 0.2 | 0.40 | Excellent | appropriately hard and easily crushed |
| Example 3 | 1.3 | 0.1 | 0.35 | Excellent | easily crushed in a crisp |
| Example 4 | 2.1 | 0.1 | 0.47 | Good | sort of hard but easily crushed |
| Example 5 | 1.3 | 0.1 | 0.37 | Excellent | appropriately hard and easily crushed |
| Example 6 | 1.2 | 0.1 | 0.34 | Excellent | easily crushed in a crisp |
| Example 7 | 1.5 | 0.1 | 0.43 | Good | sort of hard but easily crushed |
| Example 8 | 1.5 | 0.1 | 0.43 | Excellent | soft and easily crushed |
| Example 9 | 1.5 | 0.1 | 0.43 | Good | sort of hard but easily crushed |
| Example 10 | 1.5 | 0.1 | 0.43 | Good | sort of hard but easily crushed |
| Example 11 | 2.2 | 0.1 | 0.44 | Good | sort of hard but easily crushed |
| Example 12 | 3.2 | 0.1 | 0.46 | Excellent | soft and easily crushed |
| Example 13 | 1.3 | 0.1 | 0.35 | Excellent | easily crushed in a crisp |
| Example 14 | 0.4 | 0.0 | 0.40 | Excellent | easily crushed in a crisp |
| Example 15 | 0.4 | 0.1 | 0.20 | Excellent | easily crushed in a crisp |
| Example 16 | 1.4 | 0.1 | 0.40 | Excellent | easily crushed in a crisp |
| Example 17 | 1.5 | 0.1 | 0.43 | Excellent | easily crushed in a crisp |
| Example 18 | 1.5 | 0.1 | 0.43 | Excellent | easily crushed in a crisp |
| Example 19 | 1.4 | 0.1 | 0.40 | Good | sort of hard but easily crushed |

In the table, the shell thickness represents the average measured in three points. The shell ratio is calculated from the total weight of the capsule and the shell weight (the average of thirty samples).
The crush strength, the water content, the water activity in the shell (AW) and distance represent the average of thirty samples and (X) represents crush strength (g)/outer diameter (mm) of the capsule.

Reference Examples 1 to 5

The capsule shell liquid was prepared by using the mixed liquid where a capsule to be obtained would be according to the formulation described in the following Table 19, and the capsule was prepared in a similar manner to Example 1 proviso by using the obtained capsule shell liquid, and the properties of the obtained capsule were measured. The results are shown in the following Table 20.

TABLE 19

| | Content Ratio (weight %) | | |
|---|---|---|---|
| Materials of capsule shell | Reference Example 1 | Reference Example 2 | Reference Example 3 |
| Fish gelatin | 65.0 | 76.0 | 73.0 |
| Enzymolysis product of guar gum | 10.0 | — | — |
| Glycerin | 11.0 | 11.0 | 15.0 |
| Food Blue No. 1 | 0.5 | 0.5 | 0.5 |
| Water | Remaining amount | Remaining amount | Remaining amount |
| Total | 100.0 | 100.0 | 100.0 |

The capsules obtained in Reference Examples 1 and 2 were burst when those were pressed with fingers, but every the capsule was difficult to be collapsed so that was not amused sound and feeling rupturing the capsule. The obtained capsule on Reference example 3 was not burst when that was pressed with fingers.

TABLE 20

| | Outer diameter of capsule (mm) | Shell thickness (μm) Average | Shell thickness (μm) SD | Shell ratio (%) | Total weight of capsule (mg) | Shell weight (mg) | 22° C., 60% Crush strength (g) | 22° C., 60% Crush strength SD | 22° C., 60% (X) | 22° C., 60% Water content (%) | 22° C., 60% Shell AW |
|---|---|---|---|---|---|---|---|---|---|---|---|
| Reference Example 1 | 3.5 | 50 | 5.26 | 11 | 22 | 2.4 | 2246 | 410 | 641.7 | 11.6 | 0.59 |
| Reference Example 2 | 3.5 | 53 | 1.10 | 8 | 21.4 | 1.7 | 1813 | 383 | 518.0 | 15.1 | 0.59 |
| Reference Example 3 | 3.5 | 158 | 15.01 | 32.3 | 20 | 9.5 | cannot be measured | — | — | 11.5 | 0.59 |

| | 22° C, 80% Distance (mm) | 22° C, 80% SD | Distance/Outer diameter | Capsule quality | Crushing feeling |
|---|---|---|---|---|---|
| Reference Example 1 | 1.9 | 0.3 | 0.54 | FAIR | hard and hardly crushed |
| Reference Example 2 | 2.2 | 0.2 | 0.63 | FAIR | sort of hard and hardly crushed |
| Reference Example 3 | 3.1 | — | 0.88 | FAIR | not crushed |

In the table, the shell thickness represents the average measured in three points. The shell ratio is calculated from the total weight of the capsule and the shell weight (the average of thirty samples).
The crush strength, the water content, the water activity in the shell (AW) and distance represent the average of thirty samples and (X) represents crush strength (g)/outer diameter (mm) of the capsule.
Distance in Reference 3 represents the distance (mm) that is deformed to reach the maximum load.

Examination Example 1

Heat Resistance Test

The capsule of each samples described in the above Examples and Reference Examples was allowed to stand in a thermostatic bath at 80° C. for 60 minutes, and softening and dissolution of the capsules were visually confirmed.

In the capsule of Examples, since softening and dissolution of the capsule were not observed, it was confirmed that the capsule of the present invention had excellent heat resistance properties. The photographs of the capsule after the heat resistance test in Examples 7, 8 and 13 and Reference Example are shown in FIG. 3. In FIG. 3, the capsules from left represents the capsule of Examples 7, 8 and 13, respectively, and the extreme right represents Reference Example 1. As shown in FIG. 4, when sample bottle was upside down, the capsule was softened to adhere to the bottle in terms of the capsule of Reference Example 1.

Examination Example 2

Moisture Resistance Test

The capsule of each sample described in the above Examples and Reference examples was allowed to stand for 120 minutes under the condition of 25° C., 85% RH, and outflow of the content, the deformation and discoloration of the capsule, adhesion between capsules each other were visually confirmed.

In the capsule of Examples, the outflow of the content, the deformation and discoloration of the capsule, adhesion between capsules each other were never observed. In the capsule of Reference Examples 1, 2 and 3, softening, deformation of the capsule, and adhesion between capsules each other were observed.

Examples 20, 21, 22 and Reference Example 4

The capsule shell liquid was prepared by using the mixed liquid where a capsule or a shell to be obtained would be according to the formulation described in the following Table 21, and the capsule or capsule shell was prepared in a similar manner to Example 1 proviso by using the obtained capsule shell liquid, and the properties of the obtained capsule were measured.

First, in terms of Examples 20 and 21, the capsules were prepared in a manner similar to Example 1, and the properties were measured in a similar manner to Example 1.

As for Examples 20, 21, 22 and Reference Example 4, the shell was obtained in the following manner, and the obtained shell was evaluated for heat resistance and moisture resistance.

The shell was prepared by preparing a 5 wt % aqueous solution, heating it to 95° C., and pouring 10 g of the aqueous solution in a petri dish with a 90 mm diameter, and drying the solution under the condition of 22° C., 60% RH until the water content to be 12.5 wt %. Then, the obtained shell which was cut into 2 cm×2 cm size was immersed in warm water at 70° C. and 75° C., then, it was confirmed whether the shell dissolved or not.

Further since the provided shells were not dissolved even in warm water at 75° C. as described below in the composition described in Examples 20 and 22, further the capsules were immersed in warm water at 80° C. and then, it was confirmed whether the shell dissolved or not.

The results are shown in the following Tables 22 and 23.

TABLE 21

| | Content Ratio (pts.wt.) | | | |
|---|---|---|---|---|
| Ingredients | Example 20 | Example 21 | Example 22 | Reference Example 4 |
| Kappa carrageenan | 24.0 | 24.0 | 24.0 | 24.0 |
| Powdered agar | 24.0 | 24.0 | 24.0 | 24.0 |
| Enzymolysis product of guar gum | 24.0 | — | 24.0 | — |
| Sodium alginate | 13.0 | 13.0 | — | — |
| Starch decomposition product | 9.0 | 9.0 | 9.0 | 9.0 |
| Glycerin | 5.0 | 5.0 | 5.0 | 5.0 |
| Food Yellow No. 1 | 1.0 | 1.0 | 1.0 | 1.0 |

TABLE 22

| | Outer diameter of capsule (mm) | Shell thickness (μm) Average | Shell thickness (μm) SD | Shell ratio (%) | Total weight of capsule (mg) | Shell weight (mg) | 22° C., 60% Crush strength (g) | 22° C., 60% SD | 22° C., 60% (X) | 22° C., 60% Water content (%) | 22° C., 60% Shell AW | 22° C., 80% Distance (mm) | 22° C., 80% SD | 22° C., 80% Distance/ Outer diameter |
|---|---|---|---|---|---|---|---|---|---|---|---|---|---|---|
| Example 20 | 3.5 | 38 | 3.88 | 10 | 22 | 2.2 | 1371 | 271 | 392 | 14.9 | 0.57 | 1.6 | 0.1 | 0.46 |
| Example 21 | 3.5 | 35 | 4.25 | 10 | 22 | 2.2 | 1971 | 438 | 563 | 15.2 | 0.54 | 1.7 | 0.2 | 0.49 |

In the table, the shell thickness represents the average measured in three points. The shell ratio is calculated from the total weight of the capsule and the shell weight (the average of thirty samples).
The crush strength, the water content, the water activity in the shell (AW) and distance represent the average of thirty samples and (X) represents crush strength (g)/outer diameter (mm) of the capsule.

TABLE 23

| Composition | Water temperature | | |
|---|---|---|---|
| | 70° C. | 75° C. | 80° C. |
| Example 20 | Good | Good | Good |
| Example 21 | Good | Fair | — |
| Example 22 | Good | Good | Poor |
| Reference Example 4 | Good | Fair | — |

Good: not dissolved after one hour has passed.
Poor: dissolved partially.
Fair: almost dissolved.

As shown in results in the above tables, it was found that the combination of agar and carrageenan as the shell-forming material with shell-forming agent (particularly at least guar gum) showed more excellent properties comparing with the case without the said combination.

First, the results in Table 22 show that the capsule having relatively excellent properties was obtained by the combination of agar and carrageenan with the shell-forming agent, but in particular, a combination of agar and carrageenan with guar gum can archived smaller SD (Standard Deviation) value. The SD value is regarded as an index of the homogeneity of the capsule quality, and the smaller SD value is the more homogeneous.

The difference of SD between Examples 20 and 21 is 0.1 at 22° C., 80% RH, but considering that the value of the distance is around several (mm), the SD difference 0.1 can be said to be big. In fact, when the capsules of Examples 20 and 21 were pressed by the fingers, the capsule of Example 20 was easily ruptured without any problem in a good cracking feeling, but comparing with capsules of Examples 20 and 21, some capsules not ruptured with rather high pressure by the fingers and on the contrary, some capsules ruptured too easily are also confirmed, which showed a significant difference in terms of a rupturing feeling between Examples 20 and 21.

Also, as is clear from the results of Table 23, by combining agar, carrageenan and a shell-forming agent, the shell with high resistance to warm water is obtained, and especially by a further combination of guar gum, it is possible to further reduce the solubility against warm water, which improves heat resistance and moisture resistance. In other words, even relatively increasing the ratio of carrageenan and agar in capsules by eliminating the guar gum did not reach the dissolution inhibiting effect by the addition of guar gum.

Example 22 and Reference Example 4 are the result of removing sodium alginate which has a component of Example 20, and with the addition of sodium alginate, changes against the solubility in hot water were observed that is, slightly dissolved at 80° C., but however the changes were smaller compared with those caused by whether adding guar gum or not. These results show that guar gum specifically contributes to the improvement of heat resistance and moisture resistance.

Examples 23 to 27

Powdered agar, an enzymolysis product of guar gum, sodium alginate, kappa carrageenan, glycerin, a starch decomposition product (Maltodextrin), Food Blue No. 1 and water were mixed so that a capsule to be obtained would be the ratio described in the following Table and the mixture was dissolved at 95° C. (the viscosity of the mixed liquid: 148 mPa·s), and after defoaming, it was allowed to stand to give the capsule shell liquid.

TABLE 24

| Materials of capsule shell | Content Ratio (weight %) |
|---|---|
| Kappa carrageenan | 10.0 |
| Powdered agar | 40.0 |
| Enzymolysis product of guar gum | 30.0 |
| Sodium alginate | 11.0 |
| Starch decomposition Product (Maltodextrin) | 1.5 |
| Glycerin | 7.0 |
| Food Blue No. 1 | 0.5 |
| Total | 100.0 |

The capsules having various kinds of outer diameter (1.0 mm, 2.0 mm, 3.5 mm, 6 mm, and 10 mm) were prepared by mixing the above capsule shell liquid with rose oil as a capsule content in the seamless capsule manufacturing apparatus (product name: SPHEREX (registered trademark, made by Freund Corporation), followed by controlling the temperature of capsule contents to 20° C.+/−2° C. near the multiplex nozzle, controlling the temperature of the capsule shell liquid to 70° C.+/−2° C., and then cooling with cooling oil (around 10° C.). Then, treating the said capsule with drying (25° C., 50% or less of humidity RH) gave the said seamless capsule. The properties of the obtained capsule were measured. The results are shown in the following Table 25.

The obtained capsule was translucent and was blue. The obtained capsule was taken and placed the pressure by the fingers to be ruptured easily with a snap, where the cracking sound and feeling of the capsule could be enjoyed. In addition, sweet rose scent can be also enjoyed.

Examples 28 to 32

The each capsule described in Examples 23 to 27 was coated to be a 2% weight per capsule total weight by using 10% starch diluted solution according to the known methods. The properties of the obtained capsule were measured. The results are shown in the following Table 25.

The obtained capsule was translucent and blue. The obtained capsule was taken and imposed the pressure by the fingers to be ruptured easily with a snap, where the cracking sound and feeling of the capsule could be enjoyed. In addition, sweet rose scent can be also enjoyed.

TABLE 25

| | Outer diameter of capsule (mm) | Shell thickness (μm) Average | Shell thickness (μm) SD | Shell ratio (%) | Total weight of capsule (mg) | Shell weight (mg) | 22° C., 60% Crush strength (g) | 22° C., 60% Crush strength SD | 22° C., 60% (X) | 22° C., 60% Water content (%) | 22° C., 60% Shell AW |
|---|---|---|---|---|---|---|---|---|---|---|---|
| Example 23 | 1.0 | 23 | 1.29 | 15 | 0.5 | 0.1 | 298 | 48 | 298 | 15.1 | 0.58 |
| Example 24 | 2.0 | 31 | 1.88 | 15 | 4 | 0.6 | 496 | 90 | 248 | 14.5 | 0.57 |
| Example 25 | 3.5 | 46 | 2.39 | 10 | 22 | 2.2 | 1538 | 195 | 439 | 15.1 | 0.59 |
| Example 26 | 6.0 | 70 | 4.31 | 7.5 | 105 | 7.875 | 2281 | 356 | 380 | 14.9 | 0.57 |
| Example 27 | 10.0 | 83 | 4.79 | 5.5 | 490 | 26.95 | 3507 | 531 | 351 | 15.0 | 0.58 |
| Example 28 | 1.0 | 30 | 1.50 | 15 | 0.5 | 0.1 | 309 | 41 | 309 | 14.8 | 0.56 |
| Example 29 | 2.0 | 37 | 1.66 | 15 | 4 | 0.6 | 528 | 77 | 264 | 14.5 | 0.56 |
| Example 30 | 3.5 | 51 | 1.89 | 10 | 22 | 2.2 | 1584 | 186 | 453 | 15.0 | 0.57 |
| Example 31 | 6.0 | 77 | 3.80 | 7.5 | 105 | 7.875 | 2301 | 312 | 384 | 14.6 | 0.56 |
| Example 32 | 10.0 | 95 | 4.43 | 5.5 | 490 | 26.95 | 3731 | 487 | 373 | 15.0 | 0.56 |

| | 22° C., 80% Distance (mm) | 22° C., 80% SD | Distance/Outer diameter | Capsule quality | Crushing feeling |
|---|---|---|---|---|---|
| Example 23 | 0.4 | 0.03 | 0.4 | Excellent | appropriately hard and easily crushed |
| Example 24 | 0.4 | 0.1 | 0.2 | Excellent | appropriately hard and easily crushed |
| Example 25 | 1.4 | 0.1 | 0.4 | Excellent | appropriately hard and easily crushed |
| Example 26 | 2.4 | 0.3 | 0.4 | Excellent | appropriately hard and easily crushed |
| Example 27 | 4.3 | 0.4 | 0.43 | Excellent | appropriately hard and easily crushed |
| Example 28 | 0.4 | 0.03 | 0.4 | Excellent | appropriately hard and easily crushed |
| Example 29 | 0.4 | 0.1 | 0.2 | Excellent | appropriately hard and easily crushed |
| Example 30 | 1.4 | 0.1 | 0.4 | Excellent | appropriately hard and easily crushed |
| Example 31 | 2.2 | 0.3 | 0.4 | Excellent | appropriately hard and easily crushed |
| Example 32 | 4.2 | 0.4 | 0.42 | Excellent | appropriately hard and easily crushed |

In the table, the shell thickness represents the average measured in three points. The shell ratio is calculated from the total weight of the capsule and the shell weight (the average of thirty samples).
The crush strength, the water content, the water activity in the shell (AW) and distance represent the average of thirty samples and (X) represents crush strength (g)/outer diameter (mm) of the capsule.

INDUSTRIAL APPLICABILITY

The breakable capsule of the present invention is characterized by having no adhesion between capsules each other, having excellent heat resistance and moisture resistance, having no over time change of the capsule contents, being easily ruptured under the pressure imposed by the fingers, having good cracking feeling, releasing the content, and preventing the discoloration, and for example, that can be buried in a smoking device.

EXPLANATION OF THE MARKS

1: A capsule content
2: A capsule shell
3: A breakable capsule
4: An inner nozzle
5: An outer nozzle
6: Carrier flow
A: An input port of the capsule content materials
B: An input port of the capsule shell materials

The invention claimed is:

1. A breakable capsule, comprising:
a content of an oily ingredient, and
a capsule shell comprising at least one shell-forming material,
having a shell ratio of 5.0% or more and 18.0% or less, and
satisfying the following equation (1) and equation (2), $$150 < (X) < 630 \quad (1)$$

wherein (X) represents a crush strength (g)/an outer diameter of the capsule (mm), $$0.15 < (Y) < 0.53 \quad (2)$$

wherein (Y) represents a distance/an outer diameter ratio, where the distance represents the distance (mm) that is deformed to reach a maximum load when the capsule ruptures from pressure under a condition of 22° C., 80% RH.

2. The breakable capsule according to claim 1, wherein the equation (2) is $0.18 < (Y) < 0.5$,
the capsule shell has a thickness of 5 to 120 μm,
the capsule shell has a water content ratio of 10.0 to 19.0%,
the crush strength is 150 to 4000 g,
the capsule shell has a water activity of 0.400 or more and 0.650 or less,
the outer diameter of the capsule is 1.0 to 15.0 mm, and
the breakable capsule is a seamless capsule.

3. The breakable capsule according to claim 1, wherein the shell-forming material is at least one selected from the group consisting of agar, carrageenan and gelatin.

4. The breakable capsule according to claim 1, wherein the shell-forming material comprises at least one material selected from the group consisting of agar having a jelly strength of 600 g/cm² or more, a gelatin having a bloom strength of 190 or more, kappa carrageenan and iota carrageenan.

5. The breakable capsule according to claim 1, wherein the shell-forming material comprises agar and carrageenan.

6. The breakable capsule according to claim 5, wherein a weight ratio of agar relative to carrageenan (agar/carrageenan) is 90/10 to 30/70.

7. The breakable capsule according to claim 1, wherein the capsule shell further comprises at least one shell-forming agent selected from the group consisting of alginic acid or a salt thereof, furcellaran, curdlan, ghatti, gum arabic, pullulan, welan, xanthan gum, gellan gum, gum tragacanth, pectin, glucomannan, guar gum, tara gum, tamarind seed gum, locust bean gum, psyllium seed gum, linseed gum, and diutan gum.

8. The breakable capsule according to claim 7, wherein the shell-forming agent comprises guar gum.

9. The breakable capsule according to claim 8, wherein the guar gum comprises an enzymolysis product of guar gum.

10. The breakable capsule according to claim 7, wherein the shell-forming agent comprises guar gum and alginic acid or a salt thereof.

11. The breakable capsule according to claim 10, wherein a weight ratio of alginic acid or a salt thereof relative to guar gum (alginic acid or salt/guar gum) is 70/30 to 10/90.

12. The breakable capsule according to claim 7, wherein a weight ratio of the shell-forming material and the shell-forming agent relative to the capsule shell is 60 wt % or more, and a weight ratio of the shell-forming agent is 0.1 to 5 parts by weight based on 1 part by weight of the shell-forming material.

13. The breakable capsule according to claim 7,
wherein the shell-forming material comprises agar and carrageenan, and the shell-forming agent comprises guar gum;
wherein a weight ratio of agar relative to carrageenan (agar/carrageenan) is 85/15 to 35/65;
a weight ratio of the shell-forming material and the shell-forming agent relative to the capsule shell is 70 wt % or more; and
a weight ratio of the shell-forming agent in the capsule shell is 0.3 to 3 parts by weight based on 1 part by weight of the shell-forming material.

14. The breakable capsule according to claim 1, wherein the capsule shell further comprises at least one plasticizer selected from the group consisting of polyhydric alcohol, monosaccharide, disaccharide, oligosaccharide, sugar alcohol, polyvinyl alcohol, triacetin, a starch derivative, starch and a cellulose derivative.

15. The breakable capsule according to claim 14, wherein the plasticizer comprises glycerin as a polyhydric acid, and at least one additional plasticizer selected from the group consisting of starch, a starch derivative and a cellulose derivative, wherein a weight ratio of the glycerin relative to the additional plasticizer (glycerin/additional plasticizer) is 90/10 to 10/90.

16. The breakable capsule according to claim 14, wherein a weight ratio of the plasticizer is 3 to 40 parts by weight based on 100 parts by weight of the shell-forming material.

17. A smoking device comprising the breakable capsule according to claim 1.

18. A breakable capsule, comprising:
a content of an oily ingredient, and
a capsule shell comprising:
a shell-forming material comprising agar and carrageenan, and
a shell-forming agent comprising guar gum and alginic acid or a salt thereof,
wherein a weight ratio of the shell-forming agent is 0.25 to 5 parts by weight based on 1 part by weight of the shell-forming material.

19. The breakable capsule according to claim 18, wherein the guar gum comprises an enzymolysis product of guar gum.

20. The breakable capsule according to claim 18, wherein the capsule shell further comprises at least one plasticizer selected from the group consisting of polyhydric alcohol, monosaccharide, disaccharide, oligosaccharide, sugar alcohol, polyvinyl alcohol, triacetin, a starch derivative, starch and a cellulose derivative.

21. A smoking device comprising the breakable capsule according to claim 18.

* * * * *